US012781015B2

(12) United States Patent
Boudreaux et al.

(10) Patent No.: US 12,781,015 B2
(45) **Date of Patent: *Nov. 3, 2026**

(54) BARRIER COATING COMPOSITION FOR USE IN MANUFACTURING POLYMER FOAM PRODUCTS

(71) Applicant: Owens Corning Intellectual Capital, LLC, Toledo, OH (US)

(72) Inventors: Chase Boudreaux, Canton, OH (US); Jeff Thomas, Mogadore, OH (US); Mitchell Weekley, Tallmadge, OH (US); Christine Heppe, Norton, OH (US); Laura Frazier, Kent, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 142 days.

This patent is subject to a terminal disclaimer.

(21) Appl. No.: 17/954,560

(22) Filed: Sep. 28, 2022

(65) Prior Publication Data

US 2023/0096736 A1 Mar. 30, 2023

Related U.S. Application Data

(60) Provisional application No. 63/249,246, filed on Sep. 28, 2021.

(51) Int. Cl.
*C08J 9/36* (2006.01)
*C08J 9/12* (2006.01)
(Continued)

(52) U.S. Cl.
CPC ............... *C08J 9/365* (2013.01); *C08J 9/122* (2013.01); *C08J 9/146* (2013.01); *C09D 127/04* (2013.01);
(Continued)

(58) Field of Classification Search
CPC ................ C08J 2201/03; C08J 2203/06; C08J 2203/14; C08J 2203/142; C08J 2203/162;
(Continued)

(56) References Cited

U.S. PATENT DOCUMENTS 3,432,340 A 3/1969 Mathis et al.
4,792,574 A 12/1988 Berkowitz
(Continued)

FOREIGN PATENT DOCUMENTS

CA 2353571 A1 6/2000
DE 102009011819 A1 9/2010
(Continued)

OTHER PUBLICATIONS

International Search Report and Written Opinion from PCT/US2022/044992 dated Jan. 11, 2023.
(Continued)

*Primary Examiner* — Hai Vo
(74) *Attorney, Agent, or Firm* — Calfee, Halter & Griswold LLP

(57) ABSTRACT

A foamed polymeric insulation product comprises a polymeric foam formed from a foamable polymer composition comprising: a) a thermoplastic matrix polymer composition, and b) a blowing agent composition. A barrier coating is formed on at least one of the first major surface and the second major surface, the barrier coating being formed from a barrier coating composition comprising a dispersion of at least one polymer comprising at least one polymer selected from polyvinylidene dichloride (PVDC), polyvinylidene fluoride (PVDF), polyvinyl chloride (PVC), polyvinyl alcohol, ethylene vinyl alcohol, polyurethane, styrene butadiene (SBR), and combinations or copolymers thereof; and a viscosity modifier.

13 Claims, 11 Drawing Sheets

(51) Int. Cl.
*C08J 9/14* (2006.01)
*C09D 127/04* (2006.01)
*C09D 175/04* (2006.01)

(52) U.S. Cl.
CPC ......... *C09D 175/04* (2013.01); *C08J 2325/06* (2013.01); *C08J 2427/04* (2013.01); *C08J 2475/04* (2013.01)

(58) Field of Classification Search
CPC ............ C08J 2203/182; C08J 2203/202; C08J 2325/06; C08J 2409/06; C08J 2423/02; C08J 2423/08; C08J 2427/04; C08J 2427/08; C08J 2429/04; C08J 2475/04; C08J 9/0061; C08J 9/122; C08J 9/141; C08J 9/144; C08J 9/146; C08J 9/365; C08L 25/06; C09D 127/04; C09D 175/04
See application file for complete search history.

(56) References Cited

U.S. PATENT DOCUMENTS 5,231,139 A 7/1993 Michel et al.
5,344,867 A 9/1994 Morgan et al.
5,532,284 A 7/1996 Bartlett et al.
5,720,892 A 2/1998 Deangelis et al.
5,902,753 A 5/1999 Demott et al.
6,028,975 A 2/2000 Davidson
6,306,519 B1 10/2001 Sakai et al.
6,317,541 B1 11/2001 Davidson
6,740,394 B2 5/2004 Jacobsen et al.
6,979,715 B2 12/2005 Manfredi et al.
7,026,384 B2 4/2006 Vanderveken et al.
7,078,473 B2 7/2006 Lacroix-Desmazes et al.
7,148,160 B2 12/2006 Porter
7,238,299 B2 7/2007 Singh et al.
7,279,451 B2 10/2007 Singh et al.
7,393,799 B2 7/2008 Porter
7,432,311 B2 10/2008 Mezzenga et al.
7,459,496 B2 12/2008 Hsu et al.
7,465,879 B2 12/2008 Glew
7,473,218 B2 1/2009 Segawa et al.
7,473,729 B2 1/2009 Feeney et al.
7,473,849 B2 1/2009 Glew
7,473,850 B2 1/2009 Glew
7,605,188 B2 10/2009 Loh et al.
7,624,910 B2 12/2009 Barnes et al.
7,655,610 B2 2/2010 Singh et al.
7,718,253 B2 5/2010 Griffin et al.
7,811,663 B2 10/2010 Paradis et al.
7,837,614 B2 11/2010 Segawa et al.
7,892,164 B2 2/2011 Segawa et al.
7,972,524 B2 7/2011 Robin
7,972,525 B2 7/2011 Robin
8,053,404 B2 11/2011 Singh et al.
8,063,119 B2 11/2011 Feeney et al.
8,065,882 B2 11/2011 Singh et al.
8,105,685 B2 1/2012 Paradis et al.
8,217,119 B2 7/2012 Abusleme et al.
8,262,924 B2 9/2012 Robin
8,287,997 B2 10/2012 Paradis et al.
8,313,818 B2 11/2012 Vo et al.
8,314,159 B2 11/2012 Chen et al.
8,314,161 B2 11/2012 Polasky et al.
8,324,298 B2 12/2012 Dewael et al.
8,324,322 B2 12/2012 Fringant et al.
8,349,909 B2 1/2013 Delaviz et al.
8,378,001 B2 2/2013 Delaviz et al.
8,426,017 B2 4/2013 Paradis et al.
8,470,436 B1 6/2013 Paradis et al.
8,479,467 B2 7/2013 Johnson et al.
8,507,576 B2 8/2013 Vanderveken et al.
8,513,144 B2 8/2013 Ting et al.
8,524,792 B2 9/2013 Polasky et al.
8,568,632 B2 10/2013 Rynd et al.
8,597,779 B2 12/2013 Paradis et al.
8,617,699 B2 12/2013 Paradis et al.
8,623,808 B2 1/2014 Singh et al.
8,648,123 B2 2/2014 Van Horn et al.
8,754,142 B2 6/2014 Delaviz et al.
8,754,143 B2 6/2014 Delaviz et al.
8,763,847 B2 7/2014 Mortarotti
8,772,364 B2 7/2014 Van Horn et al.
8,895,635 B2 11/2014 Van Horn et al.
8,969,491 B2 3/2015 Fringant et al.
9,005,745 B2 4/2015 Annan et al.
9,029,430 B2 5/2015 Bowman et al.
9,064,619 B2 6/2015 Gemmel et al.
9,133,973 B2 9/2015 Smith
9,150,719 B2 10/2015 Polasky et al.
9,157,017 B2 10/2015 Singh et al.
9,206,297 B2 12/2015 Van Horn et al.
9,243,359 B2 1/2016 Zafiroglu
9,245,669 B2 1/2016 Glew
9,328,042 B2 5/2016 Peng et al.
9,359,481 B2 6/2016 Breindel et al.
9,404,261 B2 8/2016 Johnson et al.
9,440,896 B2 9/2016 Peng et al.
9,453,115 B2 9/2016 Williams et al.
9,518,225 B2 12/2016 Singh et al.
9,598,857 B2 3/2017 Smith
9,695,363 B2 7/2017 Singh et al.
9,708,537 B2 7/2017 Singh et al.
9,714,330 B2 7/2017 Delaviz et al.
9,726,438 B2 8/2017 Smith
9,745,496 B2 8/2017 Kontomaris
9,752,004 B2 9/2017 Patel et al.
9,758,452 B2 9/2017 Baldychev et al.
9,796,848 B2 10/2017 Bowman et al.
9,815,955 B2 11/2017 Van Horn
9,849,405 B2 12/2017 Smith
9,862,127 B2 1/2018 Bronnum et al.
9,884,946 B2 2/2018 Singh et al.
9,895,255 B2 2/2018 Chang
9,903,525 B2 2/2018 Zheng et al.
9,909,317 B2 3/2018 Johnson et al.
9,997,279 B2 6/2018 Mayama et al.
10,018,406 B2 7/2018 Liu et al.
10,030,113 B2 7/2018 Suzuki et al.
10,035,937 B2 7/2018 Yana Motta et al.
10,053,549 B2 8/2018 Annan et al.
10,059,822 B2 8/2018 Delaviz et al.
10,066,071 B2 9/2018 Williams et al.
10,087,634 B2 10/2018 Johnson et al.
10,099,976 B2 10/2018 Baldychev et al.
10,139,035 B2 11/2018 Smith
10,150,276 B2 12/2018 Lee et al.
10,155,856 B2 12/2018 Wysong
10,184,037 B2 1/2019 Breindel et al.
10,196,156 B2 2/2019 Valentini et al.
10,204,719 B2 2/2019 Glew
10,204,720 B2 2/2019 Glew
10,227,276 B2 3/2019 Baldychev et al.
10,267,033 B2 4/2019 Garcia
10,281,079 B2 5/2019 Zheng et al.
10,290,397 B2 5/2019 Mayama et al.
10,308,782 B2 6/2019 Du et al.
10,322,024 B2 6/2019 Chang
10,337,141 B2 7/2019 Zafiroglu
10,352,494 B2 7/2019 Sapsay et al.
10,434,349 B2 10/2019 Robin
10,465,381 B2 11/2019 Garcia
10,487,031 B2 11/2019 Peng et al.
10,514,198 B2 12/2019 Liu et al.
10,519,290 B2 12/2019 Annan et al.
10,526,462 B2 1/2020 Williams et al.
10,556,371 B2 2/2020 Culeron et al.
10,619,912 B2 4/2020 Liu et al.
10,654,777 B2 5/2020 Baldychev et al.
10,676,581 B2 6/2020 Han et al.
10,704,729 B2 7/2020 Furlong
10,745,571 B2 8/2020 Zoitos et al.
10,759,920 B2 9/2020 Nappa et al.
10,851,303 B2 12/2020 Knapp et al.

(56) References Cited

U.S. PATENT DOCUMENTS 10,957,886 B2 3/2021 Liu et al.
10,968,625 B2 4/2021 Mack et al.
10,975,216 B2 4/2021 Nappa et al.
10,980,661 B2 4/2021 Chang
10,982,110 B2 4/2021 Dufils et al.
10,987,848 B2 4/2021 Culeron et al.
10,988,630 B2 4/2021 Peet et al.
11,046,875 B2 6/2021 Minor et al.
11,091,602 B2 8/2021 Van Horn et al.
11,104,777 B2 8/2021 Chai et al.
11,124,584 B2 9/2021 Chauvet et al.
11,136,482 B2 10/2021 Low
11,175,435 B1 11/2021 Ye et al.
11,208,536 B2 12/2021 Chen
11,214,648 B2 1/2022 Diloreto
11,214,957 B2 1/2022 Garcia
11,225,757 B2 1/2022 Jung et al.
11,242,681 B2 2/2022 Letts et al.
11,247,446 B2 2/2022 Field et al.
11,299,882 B2 4/2022 Nandi et al.
11,351,054 B2 6/2022 Chang
11,377,798 B2 7/2022 Flynn et al.
11,414,529 B2 8/2022 Li et al.
11,434,320 B2 9/2022 Joncheray et al.
11,447,613 B2 9/2022 Fabian et al.
11,447,616 B2 9/2022 Delaviz et al.
11,465,325 B2 10/2022 Thometschek et al.
11,472,152 B2 10/2022 Grieser-Schmitz et al.
11,597,862 B2 3/2023 Stojanovic et al.
11,598,906 B1 3/2023 Ye et al.
11,649,919 B2 5/2023 Webster et al.
11,692,114 B2 7/2023 Low
11,731,925 B2 8/2023 Peng et al.
11,806,973 B2 11/2023 Field et al.
2004/0220287 A1 11/2004 Champagne et al.
2005/0159496 A1 7/2005 Bambara et al.
2006/0029788 A1 2/2006 Lovell et al.
2006/0096205 A1 5/2006 Griffin et al.
2006/0237221 A1 10/2006 Glew
2007/0102188 A1 5/2007 Glew
2007/0142527 A1 6/2007 Rosa et al.
2007/0149628 A1 6/2007 Delaviz et al.
2007/0173554 A1 7/2007 Delaviz et al.
2007/0208094 A1* 9/2007 Handa ...................... C08J 9/142 521/79
2007/0213446 A1* 9/2007 Feeney ................ C09D 127/06 524/445
2008/0050574 A1 2/2008 Lovell et al.
2008/0051504 A1 2/2008 Mezzenga et al.
2008/0072987 A1* 3/2008 Mukawa ................... B32B 1/08 977/962
2008/0193740 A1 8/2008 Nesbitt
2008/0233358 A1 9/2008 Garcia
2008/0242752 A1 10/2008 Delaviz et al.
2008/0242754 A1 10/2008 Champagne et al.
2008/0264670 A1 10/2008 Glew
2008/0281012 A1 11/2008 Van Horn
2008/0287560 A1 11/2008 Loh et al.
2009/0062450 A1 3/2009 Feeney et al.
2009/0104407 A1 4/2009 Johnson et al.
2009/0220717 A1* 9/2009 Wilczak ................... C08J 7/048 427/508
2009/0270522 A1 10/2009 Singh et al.
2010/0078585 A1 4/2010 Robin
2010/0105789 A1 4/2010 Van Horn et al.
2010/0112328 A1 5/2010 Van Horn et al.
2010/0113629 A1 5/2010 Van Horn et al.
2010/0132295 A1* 6/2010 Bootier ............... E04F 13/0841 52/582.1
2010/0179237 A1 7/2010 Bertelo et al.
2010/0189977 A1 7/2010 Griffin et al.
2010/0206609 A1 8/2010 Glew
2010/0231109 A1 9/2010 Matzke et al.
2010/0243291 A1 9/2010 Glew
2010/0304075 A1 12/2010 Petela et al.
2010/0331433 A1 12/2010 Annan et al.
2011/0144216 A1 6/2011 Hulse et al.
2011/0144221 A1 6/2011 Delaviz et al.
2011/0240903 A1 10/2011 Robin
2011/0274900 A1 11/2011 Megally et al.
2012/0101177 A1 4/2012 Van Horn et al.
2012/0161061 A1 6/2012 Hahn et al.
2012/0225961 A1 9/2012 Van Horn et al.
2012/0328806 A1 12/2012 Dewael et al.
2013/0236612 A1 9/2013 Deng et al.
2013/0264012 A1 10/2013 Johnson et al.
2014/0213678 A1 7/2014 Van Horn et al.
2014/0275308 A1 9/2014 Annan et al.
2014/0316020 A1 10/2014 Han et al.
2014/0357791 A1 12/2014 Vinas et al.
2015/0176211 A1 6/2015 Knapp et al.
2015/0224665 A1 8/2015 Mostafa
2015/0266652 A1 9/2015 Peppou
2015/0299414 A1 10/2015 Van Horn et al.
2016/0009886 A1 1/2016 Han et al.
2016/0017111 A1 1/2016 Delaviz et al.
2016/0039728 A1 2/2016 Peng et al.
2016/0068731 A1 3/2016 Minor et al.
2016/0347694 A1 12/2016 Baldychev et al.
2016/0347922 A1 12/2016 Han et al.
2017/0009116 A1 1/2017 Hulse et al.
2017/0015607 A1 1/2017 Baldychev et al.
2017/0072080 A1 3/2017 Robin et al.
2017/0369403 A1 12/2017 Baldychev et al.
2018/0043199 A1 2/2018 Robin
2018/0112052 A1 4/2018 Han et al.
2018/0320370 A1 11/2018 Letts et al.
2018/0327565 A1 11/2018 Kontomaris et al.
2018/0334547 A1 11/2018 Loh et al.
2018/0362421 A1 12/2018 Baldychev et al.
2018/0371758 A1 12/2018 Johnson et al.
2019/0031582 A1 1/2019 Peng
2019/0071227 A1 3/2019 Takagi et al.
2019/0077935 A1 3/2019 Han et al.
2019/0100639 A1 4/2019 Wysong
2019/0144629 A1 5/2019 Van Horn et al.
2019/0153148 A1* 5/2019 Barksby ............. C08G 18/4812
2019/0153181 A1 5/2019 Gawryla
2019/0164668 A1 5/2019 Glew
2019/0164669 A1 5/2019 Glew
2019/0211136 A1* 7/2019 Hasegawa ............ C08G 18/757
2019/0211172 A1 7/2019 Wysong et al.
2019/0211174 A1 7/2019 Creazzo et al.
2019/0211962 A1* 7/2019 Kress .................... F16L 59/143
2019/0217138 A1 7/2019 Robins
2019/0218358 A1 7/2019 Creazzo et al.
2019/0248719 A1 8/2019 Baldychev et al.
2019/0256679 A1 8/2019 Wysong et al.
2019/0338088 A1 11/2019 Kress et al.
2019/0368650 A1 12/2019 Sapsay et al.
2019/0390026 A1 12/2019 Li et al.
2020/0017740 A1 1/2020 Hulse et al.
2020/0118704 A1 4/2020 Furukawa et al.
2020/0231735 A1 7/2020 Salsman
2020/0262994 A1 8/2020 Han et al.
2020/0283957 A1 9/2020 Flynn et al.
2020/0291244 A1 9/2020 Pan et al.
2020/0325297 A1 10/2020 Kontomaris
2020/0362133 A1* 11/2020 Peterson .................... C08J 9/40
2020/0369893 A1 11/2020 Zoitos et al.
2021/0017106 A1 1/2021 Peng
2021/0024673 A1 1/2021 Vinas et al.
2021/0122962 A1 4/2021 Allgood et al.
2021/0162713 A1 6/2021 Couturier et al.
2021/0163704 A1 6/2021 Zerafati et al.
2021/0206952 A1* 7/2021 Vacca ..................... B32B 27/06
2021/0207065 A1 7/2021 Matsumoto et al.
2021/0221972 A1 7/2021 Nappa et al.
2021/0238337 A1 8/2021 Joncheray et al.
2021/0238378 A1 8/2021 Wysong
2021/0253817 A1 8/2021 Robin et al.
2021/0253924 A1 8/2021 Minor et al.
2021/0261747 A1 8/2021 Kontomaris

(56) References Cited

U.S. PATENT DOCUMENTS

| | | | |
|---|---|---|---|
| 2021/0301526 | A1 | 9/2021 | Leahy |
| 2021/0340421 | A1 | 11/2021 | Simoni et al. |
| 2022/0025146 | A1 | 1/2022 | Kontomaris |
| 2022/0089925 | A1 | 3/2022 | Robin et al. |
| 2022/0089982 | A1 | 3/2022 | Wu et al. |
| 2022/0127841 | A1 | 4/2022 | Garcia |
| 2022/0135759 | A1 | 5/2022 | Chinsoga et al. |
| 2022/0153947 | A1 | 5/2022 | Gimeno et al. |
| 2022/0154453 | A1 | 5/2022 | Letts et al. |
| 2022/0161535 | A1 | 5/2022 | Field et al. |
| 2022/0162141 | A1 | 5/2022 | Peng et al. |
| 2022/0177665 | A1 | 6/2022 | Boudreaux et al. |
| 2022/0194879 | A1 | 6/2022 | Peng et al. |
| 2022/0194881 | A1 | 6/2022 | Peng et al. |
| 2022/0194882 | A1 | 6/2022 | Peng et al. |
| 2022/0195276 | A1 | 6/2022 | Peng et al. |
| 2022/0203149 | A1 | 6/2022 | Robin et al. |
| 2022/0235192 | A1 | 7/2022 | Kontomaris |
| 2022/0235193 | A1 | 7/2022 | Kontomaris |
| 2022/0290026 | A1 * | 9/2022 | Stojanovic ............. C09K 5/063 |
| 2022/0315722 | A1 | 10/2022 | Han et al. |
| 2022/0402253 | A1 | 12/2022 | Kress et al. |
| 2023/0026244 | A1 | 1/2023 | Chaduc et al. |
| 2023/0074227 | A1 | 3/2023 | Peng |
| 2023/0076355 | A1 | 3/2023 | Boudreaux et al. |
| 2023/0122012 | A1 | 4/2023 | Thometschek et al. |
| 2023/0122141 | A1 | 4/2023 | Boudreaux et al. |
| 2023/0174838 | A1 | 6/2023 | Stojanovic et al. |
| 2023/0332031 | A1 | 10/2023 | Musyimi et al. |
| 2023/0416484 | A1 | 12/2023 | Han et al. |
| 2024/0158597 | A1 | 5/2024 | Kontomaris |
| 2024/0327593 | A1 * | 10/2024 | Boudreaux .......... C09D 129/04 |
| 2024/0327594 | A1 * | 10/2024 | Boudreaux ............ C08J 9/0095 |

FOREIGN PATENT DOCUMENTS

| | | | | |
|---|---|---|---|---|
| EP | 1816079 | A2 | 8/2007 | |
| EP | 1842976 | B1 | 8/2009 | |
| EP | 2300526 | A2 | 3/2011 | |
| EP | 3000592 | A1 | 3/2016 | |
| EP | 3686236 | A1 | 7/2020 | |
| EP | 4321591 | A1 | 2/2024 | |
| GB | 1075287 | A | 7/1967 | |
| JP | 2002144497 | A | 5/2002 | |
| WO | 9113750 | A1 | 9/1991 | |
| WO | 9621564 | A1 | 7/1996 | |
| WO | WO-0030846 | A1 * | 6/2000 | ........... B32B 27/065 |
| WO | 2014052695 | A1 | 4/2014 | |
| WO | 2015091087 | A1 | 6/2015 | |
| WO | 2019020328 | A1 | 1/2019 | |
| WO | WO-2019211259 | A1 * | 11/2019 | ........... B32B 15/043 |
| WO | 2021008951 | A1 | 1/2021 | |
| WO | 2021067355 | A1 | 4/2021 | |
| WO | 2021067367 | A1 | 4/2021 | |
| WO | 2021262518 | A1 | 12/2021 | |
| WO | 2022090604 | A1 | 5/2022 | |
| WO | 2022271620 | A1 | 12/2022 | |
| WO | 2023069570 | A1 | 4/2023 | |
| WO | 2023069571 | A1 | 4/2023 | |
| WO | 2023225069 | A1 | 11/2023 | |

OTHER PUBLICATIONS

Office Action from AU Application No. 2022354857 dated Nov. 25, 2025.

Office Action from TW Application No. 111136795 dated Apr. 15, 2026.

Office Action from NZ Application No. 808891 dated Aug. 11, 2026.

Office Action from JP Application No. 2024-517056 dated Aug. 27, 2026.

* cited by examiner

BARRIER COATING COMPOSITION FOR USE IN MANUFACTURING POLYMER FOAM PRODUCTS

CROSS-REFERENCE TO RELATED APPLICATION

This application claims the benefit of and priority to U.S. Provisional Patent Application No. 63/249,246, filed Sep. 28, 2021, the entire contents of which is incorporated herein by reference.

FIELD

This invention relates to a process for forming polymeric foams and particularly to the manufacture of extruded thermoplastic foams. This invention provides the use of a barrier coating for retaining blowing agents in thermoplastic polymeric foams to decrease blowing agent levels while maintaining desireable foam properties.

BACKGROUND

Polymeric foams, such as extruded polymeric foams or "XPS" foam, are generally manufactured by melting a polymeric matrix composition to form a polymeric melt and incorporating one or more blowing agents and other additives into the polymeric melt under conditions that provide for the thorough mixing of the blowing agent and the polymer, while preventing the mixture from foaming prematurely, e.g., under pressure. This mixture is then typically extruded through a single or multi-stage extrusion die to cool and reduce the pressure on the mixture, allowing the mixture to foam and produce a foamed product. As will be appreciated, the relative quantities of the polymer(s), blowing agent(s), and additives; the temperature; and the manner in which the pressure is reduced will impact the quality of the resulting foam product. As will also be appreciated, the foamable mixture is maintained under a relatively high pressure until it passes through an extrusion die and is allowed to expand in a region of reduced pressure.

The solubility of conventional blowing agents, such as chlorofluorocarbons ("CFCs") and certain alkanes, in a polymer melt tends to reduce the melt viscosity and improve cooling of expanded polymer melts. For example, the combination of pentane and a CFC, such as Freon 11 or 12 is partially soluble in polystyrene and has been used for generating polystyrene foams that exhibited a generally acceptable appearance and physical properties such as surface finish, cell size and distribution, orientation, shrinkage, insulation property (R-value), and stiffness.

However, in response to the environmental concerns regarding the use of such CFC compounds, the widespread use and accompanying atmospheric release of such compounds in applications such as aerosol propellants, refrigerants, foam-blowing agents and specialty solvents has recently been drastically reduced or eliminated by government regulation.

The divergence away from the use of CFCs has led to utilization of alternative blowing agents, such as hydrogen-containing chlorofluoroalkanes (HCFCs). However, HCFC's still contain some chlorine and are therefore said to have an ozone depletion potential ("ODP").

Another class of blowing agents, hydrofluorocarbons (HFC's), have been used as more ozone friendly options, offering desirable improvements, such as zero ODP and lower (but still potentially significant) global warming potential (GWP). However, these compounds are expensive, tend to be less soluble in polystyrene, and may still have significant GWP. For example, HFC-134a has a GWP of 1430.

Hydrofluoroolefin (HFO) blowing agents, which are a type of fluorinated alkene, are believed to be more environmentally friendly than traditional halogenated blowing agents. For example, HFOs are believed to have reduced ODP and GWP, compared to traditional fluorocarbon and hydrofluorocarbon blowing agents. However, these compounds tend to be expensive and there exists a need to minimize the amount of these compounds that is required to produce a polymer foam product with desirable physical properties.

BRIEF SUMMARY

The general inventive concepts are directed to a foamed polymeric insulation product comprising a polymeric foam having a first major surface and a second major surface, and a barrier coating formed on at least one of the first major surface and the second major surface. The polymeric foam is formed from a foamable polymer composition comprising a thermoplastic matrix polymer composition, and a blowing agent composition. The barrier coating is formed from a barrier coating composition comprising a dispersion of at least one polymer selected from the group consisting of polyvinylidene dichloride (PVDC), polyvinyl alcohol, ethylene vinyl alcohol, polyurethane, styrene butadiene (SBR), and combinations thereof. In some embodiments, the foamed polymeric insulation product has a thermal resistance value (R-value) after 180 days of at least 4.75 per inch or at least 5.0 per inch.

In still other embodiments, a foamable polymer composition comprises: a) 85 wt. % to 95 wt. % of a thermoplastic matrix polymer composition; and b) 5.0 wt. % to 10 wt. % of a blowing agent composition; and c) at least one polymer selected from polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof.

A method of manufacturing polymer foam, comprising: a) providing a matrix polymer melt into an extruder; b) injecting a blowing agent composition into the matrix polymer melt within the extruder to form a foamable polymer composition; d) extruding the foamable polymer composition to form a polymer foam having a first major surface and a second major surface; e) applying to at least one of the first major surface and the second major surface of the polymer foam a barrier coating composition comprising a dispersion of at least one polymer selected from the group consisting of polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof, wherein the barrier coating composition forms a barrier coating on the at least one of the first major surface and the second major surface of the polymer foam, thereby forming a coated polymer foam.

In some embodiments, the barrier coating composition further comprises at least one film-forming additive selected from the group consisting of graphene, nanoclays, inorganic layered particles, and combinations thereof.

In some embodiments, the blowing agent composition comprises a fluorinated alkene. In some embodiments, the blowing agent comprises 1,1-difluoroethane (HFC-152a), fluoroethane (HFC-161), fluoromethane (HFC-41), HFO- 1234ze-E, HFO-1336mzz-Z, HFO-1336mzz-E, HCFO-1233zd-E, HFC-365mfc, methyl formate, methylal, carbon dioxide, one or more hydrocarbons, or combinations thereof.

According to some embodiments, the matrix polymer of the foamable polymer composition is selected from the group consisting of alkenyl aromatic polymers, styrenic polymers, styrenic copolymers, styrenic block copolymers, polyolefins, halogenated vinyl polymers, polycarbonates, polyisocyanurates, polyesters, polyacrylates, polyurethanes, phenolics, polysulfone, polyphenylene sulfide, acetal resins, polyamides, polyaramides, polyimides, polyetherimides, rubber modified polymers, thermoplastic polymer blends, and combinations thereof.

In embodiments, the barrier coating is formed on the first major surface and the second major surface of the polymeric foam. In some embodiments, the barrier coating is formed on at least one minor surface of the polymeric foam.

In embodiments, the method further includes applying the barrier coating composition comprises applying the barrier coating using a roller, using a brush, or spraying the barrier coating composition onto the at least one of the first major surface and the second major surface.

In some embodiments, the method comprises injecting into the matrix polymer melt within the extruder at least one polymer comprising polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof.

According to some embodiments, the barrier coating is a first barrier coating on the at least one of the first major surface and the second major surface of the polymer foam, and the method further comprises applying to the at least one of the first major surface and the second major surface a second coating composition, wherein the second coating composition forms a second coating on the at least one of the first major surface and the second major surface of the polymer foam. In embodiments, the second coating composition comprises a dispersion of at least one polymer comprising polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof. In some embodiments, the barrier coating composition and the second coating composition comprise the same polymer. In some embodiments, the barrier coating composition comprises a first polymer and the second coating composition comprises a second polymer that is different from the first polymer.

In some embodiments, the method further comprises applying to at least one of the first major surface and the second major surface of the polymer foam a coating composition comprising a dispersion of polyurethane. In embodiments, the dispersion of polyurethane is applied on top of the barrier coating composition. In some embodiments, the barrier coating composition comprises a dispersion of polyvinyl alcohol or ethylene vinyl alcohol.

The foregoing and other objects, features, and advantages of the general inventive concepts will become more readily apparent from a consideration of the detailed description that follows.

DESCRIPTION OF THE DRAWINGS

Example embodiments will be apparent from the more particular description of certain example embodiments provided below and as illustrated in the accompanying drawings.

DETAILED DESCRIPTION

Figure 1:
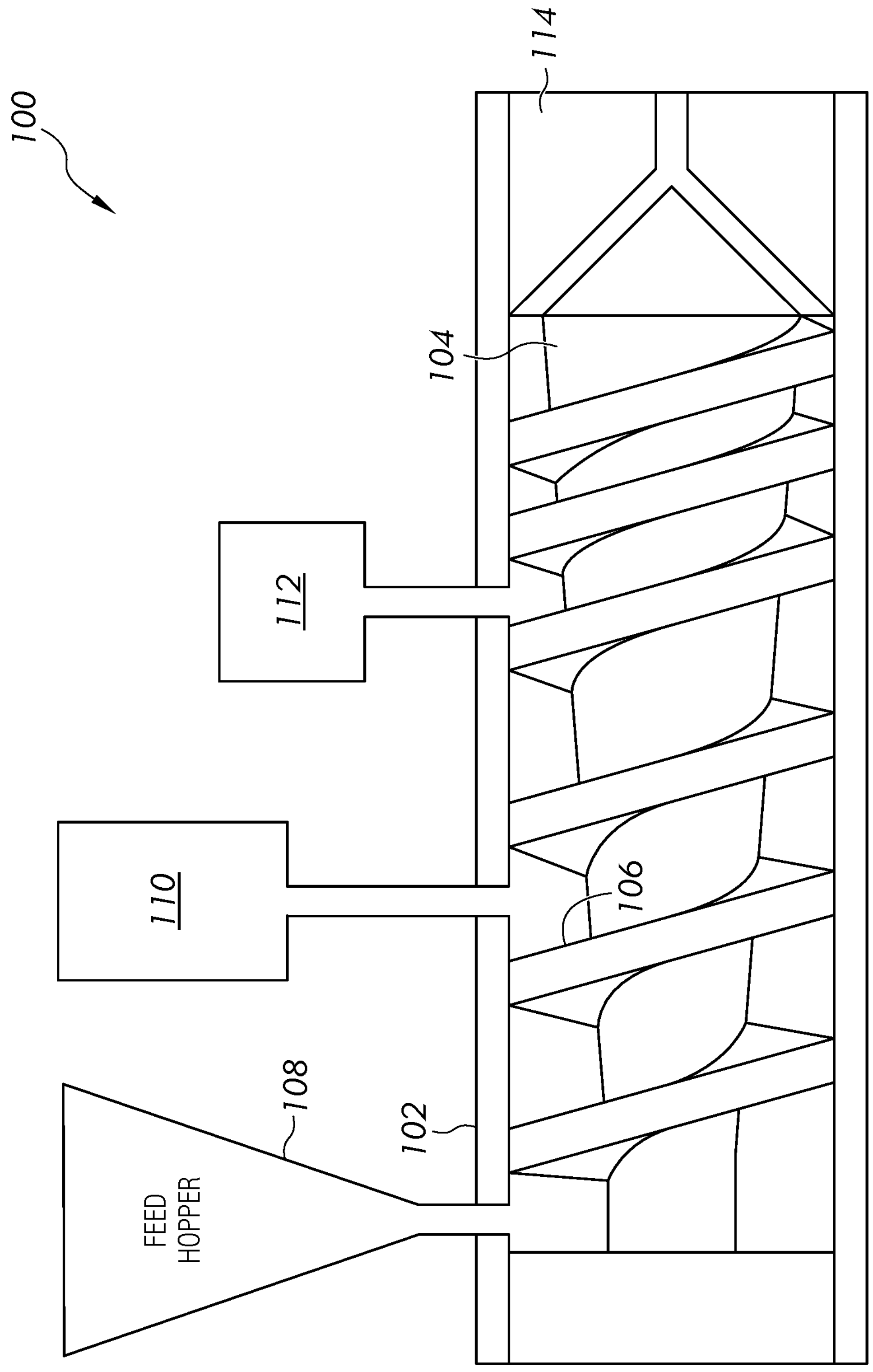
FIG. 1 is a schematic drawing of an exemplary extrusion apparatus useful for practicing methods according to one or more embodiments shown and described herein.

Unless defined otherwise, all technical and scientific terms used herein have the same meaning as commonly understood by one of ordinary skill in the art to which the embodiments belong. Although any methods and materials similar or equivalent to those described herein can be used in the practice or testing of the various embodiments, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity. It is to be noted that like numbers found throughout the figures denote like elements. The terms "composition" and "inventive composition" may be used interchangeably herein.

As used in the specification and the appended claims, the singular forms "a," "an," and "the" are intended to include the plural forms as well, unless the context clearly indicates otherwise.

Unless otherwise indicated, all numbers expressing quantities of ingredients, chemical and molecular properties, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present exemplary embodiments. At the very least, each numerical parameter should be construed in light of the number of significant digits and ordinary rounding approaches.

Unless otherwise indicated, any element, property, feature, or combination of elements, properties, and features, may be used in any embodiment disclosed herein, regardless of whether the element, property, feature, or combination of elements, properties, and features was explicitly disclosed in the embodiment. It will be readily understood that features described in relation to any particular aspect described herein may be applicable to other aspects described herein provided the features are compatible with that aspect. In particular: features described herein in relation to the method may be applicable to the insulation product and vice versa; features described herein in relation to the method may be applicable to the foamable polymer composition and vice versa; and features described herein in relation to the insulation product may be applicable to the foamable polymer composition and vice versa.

Every numerical range given throughout this specification and claims will include every narrower numerical range that falls within such broader numerical range, as if such narrower numerical ranges were all expressly written herein.

As used herein, the term "blowing agent" is understood to include physical (e.g., dissolved gaseous agents) or chemical blowing agents (e.g., a gas generated by decomposition). A blowing agent is generally added to a molten polymer, e.g., in an extruder, and under the proper conditions, to initiate foaming to produce a foamed thermoplastic. The blowing agent expands the resin and forms cells (e.g., open or closed pores). As the resin hardens or cures, foam is produced with either the blowing agent trapped in the cells or ambient air displaces the blowing agent in the cells. The blowing agents discussed herein are preferred to be environmentally acceptable blowing agents (e.g., they are generally safe for the environment) as would be recognized by one of ordinary skill in the art.

As used herein, unless specified otherwise, the values of the constituents or components of the blowing agent or other compositions are expressed in weight percent or % by weight of each ingredient in the composition.

As it pertains to the present disclosure, "closed cell" refers to a polymeric foam having a plurality of cells, at least 95% of which are closed. However, in the present application, cells may be "open cells" or closed cells (i.e., certain embodiments disclosed herein may exhibit an "open cell" polymeric foam structure).

The present disclosure relates to a polymeric foam and polymeric foam products, such as extruded or expanded polystyrene foams, formed from a composition that contains a foamable polymer material, a blowing agent composition, and a barrier coating or barrier additive that stops or slows the diffusion rate of the blowing agent composition, thereby enabling a lower amount of the blowing agent composition to be added to achieve comparable physical properties of the resultant foam or maintain the amount of blowing agent composition to achieve improved insulation properties of the resultant foam. As will be described in greater detail herein, the barrier coating can be provided on at least one major surface of the resulant foam product and/or can be incorporated into the foamable composition, depending on the particular embodiment.

FIG. 1 illustrates a traditional extrusion apparatus 100 useful for practicing methods according to various embodiments. The extrusion apparatus 100 may comprise a single or double (not shown) screw extruder including a barrel 102 surrounding a screw 104 on which a spiral flight 106 is provided and is configured to compress, and thereby, heat material introduced into the screw extruder. As illustrated in FIG. 1, the polymeric composition may be conveyed into the screw extruder as a flowable solid, such as beads, granules or pellets, or as a liquid or semi-liquid melt, from one or more (not shown) feed hoppers 108.

As the basic polymeric composition advances through the screw extruder, the decreasing spacing of the flight 106 defines a successively smaller space through which the polymeric composition is forced by the rotation of the screw. This decreasing volume acts to increase the temperature of the polymeric composition to obtain a polymeric melt (if solid starting material was used) and/or to increase the temperature of the polymeric melt.

As the polymeric composition advances through the screw extruder 100, one or more ports may be provided through the barrel 102 with associated apparatus 110, 112 for injecting one or more blowing agents and optional additives into the polymeric composition. In some embodiments, a barrier coating composition may be added through one or more of the ports, as will be described in greater detail below. Once the blowing agent(s) have been introduced into the polymeric composition, the resulting mixture is subjected to some additional blending sufficient to distribute each of the components generally uniformly throughout the polymeric composition to obtain a polymeric foamable composition.

The polymeric foamable composition is then forced through an extrusion die 114 and exits the die into a region of reduced pressure (which may be below atmospheric pressure), thereby allowing the blowing agent to expand and produce a polymeric foam material. This pressure reduction may be obtained gradually as the extruded polymeric foamable composition advances through successively larger openings provided in the die or through some suitable apparatus (not shown) provided downstream of the extrusion die for controlling to some degree the manner in which the pressure applied to the polymeric foamable composition is reduced. The polymeric foam material may also be subjected to additional processing such as coating, calendaring, water immersion, cooling sprays or other operations to control the thickness and other properties of the resulting polymeric foam product.

In any of the exemplary embodiments, a barrier coating composition may be applied to the polymeric foam product. The barrier coating composition can be applied, for example, to one or more major surfaces of the polymeric foam product using any one of a variety of coating methods. For example, the barrier coating composition can be applied via a roller, brush, spray coating method, dip coating, spin coating, flow coating, curtain coating, and the like. Other coating methods known and used in the art may be employed, depending on the particular embodiment. The barrier coating composition is then dried to form a barrier coating on the surface of the polymeric foam product. Although described as being applied to one or more major surfaces of the polymeric foam product, it should be appreciated that the barrier coating composition can additionally, or alternatively be applied to one or more minor surfaces of the polymeric foam product. For example, the barrier coating composition can be applied to one or more edges of the resulting polymeric foam product in addition to or alternatively to the top and/or bottom surfaces of the resulting polymeric foam product. The barrier coating may be applied such that it forms a continuous coating on the one or more surfaces of the polymeric foam product, or the barrier coating may form only a partial, discontinuous coating on one or more surfaces.

The barrier coating composition may be applied directly to the surface of the polymeric foam product with no intervening layers. Additional coating layers, including additional coating layers of the barrier coating composition can be applied on the first barrier coating composition layer. However, it is contemplated that in some embodiments, one or more layers can be applied between the barrier coating composition and the surface of the polymeric foam product such that the barrier coating composition is applied indirectly to the surface of the polymeric foam product (e.g., the barrier coating composition is applied to a layer on the surface of the polymeric foam product).

In any of the exemplary embodiments, the barrier coating composition may comprise a dispersion, solution, or emulsion comprising one or more polymers. The polymer may comprise poly(vinylidene chloride) (PVdC), polyvinyl alcohol (PVOH), poly(ethylene-co-vinyl alcohol) (EVOH), poly (vinylidene fluoride) (PVdF), polyurethane, styrene butadiene (SBR), polyvinylidene fluoride (PVDF), polyvinyl chloride (PVC), poly(acrylates) and copolymers, polyamides (e.g., Nylon-6), polyesters (e.g., PET), polystyrene (PS), polyglycolic acid (PGA), poly(ethylene 2,5-furandicarboxylate) (PEF), poly(butylene succinate) (PBS), bio-based ethylene (Bio-PE), and combinations or copolymers thereof. Other polymers may be incorporated, provided they are capable of imparting gas barrier properties to the coating. In some embodiments, such as when the barrier coating composition is added as part of the polymeric foamable composition, the polymer can be added in solid (e.g., resin) form, or in melted (e.g., liquid) form instead of as a dispersion, solution, or emulsion. When the polymer is added in the form of a dispersion, the dispersion may be an aqueous dispersion (e.g., the polymer is dispersed in water), or a solvent-based dispersion.

The polymer may be included in the barrier coating composition as a dispersion or emulsion comprising a solids content of about 20 wt. % to about 65 wt. % based on the total weight of the composition, including solid contents of from about 25 wt. % to about 62 wt. %, from about 35 wt. % to about 60 wt. %, from about 40 wt. % to about 58 wt. %, from about 45 wt. % to about 56 wt. %, or any other range or subrange included therein.

In some aspects, the polymer may also be characterized by the amount of polymer present in the barrier coating composition, based on the total amount of solids present in the barrier coating composition. For example, the polymer may be included in an amount of from about 40 wt. % to about 100 wt. %, based on the total amount of solids present in the barrier coating composition, including, for example, from about 50 wt. % to about 98 wt. %, from about 60 wt. % to about 96 wt. %, from about 70 wt. % to about 93 wt. %, and from about 75 wt. % to about 90 wt. %, including any other endpoints or subrange included therein.

Optionally, the barrier coating composition further comprises one or more film-forming additives. Film-forming additives can include, by way of example and not limitation, graphene, nanoclays, or inorganic layered particles. Suitable film-forming additives can include, by way of example and not limitation, cellulose nanocrystals (CNC), organosilane, perfluoroalkyl ethyl methacrylate (PPFEMA), ormocers, biowaxes/waxes, nanoclays/clays, silicon oxide ($SiO_x$), aluminum oxide films ($Al_2O_3$), graphene/graphene oxide, molybenum disulfide ($MoS_2$), tungsten disulfide ($WS_2$), niobium selenide ($NbSe_2$), hexagonal boron nitride (hBN), and combinations thereof. The film-forming additives aid the barrier coating composition in forming a continuous film on the surface of the polymeric foam product and may contribute to the barrier properties of the barrier coating. When included, the film-forming additives can be included in the barrier coating composition in an amount of from 0.1 wt. % to 50 wt. %, including from 0.5 wt. % to 25 wt. %, from 1 wt. % to 20 wt. %, or from 5 wt. % to 15 wt. % of the barrier coating composition based on a total amount of solids present in the composition.

Optionally, the barrier coating composition may include one or more fillers, such as platelet-type additive, such as graphene, nanoclay, inorganic layered particles, including mica, talc, and aluminum flake, or combinations thereof. In some exemplary embodiments, the one or more fillers may be included in at least 0.25 wt. % of the barrier coating composition, based on a total amount of solids present in the composition. The one or more fillers may be included in about 0.5 wt. % to about 50 wt. %, including about 1 wt. % to about 35 wt. %, about 5 wt. % to about 30 wt. % and about 10 wt. % to about 25 wt. % of the barrier coating composition based on a total amount of solids present in the composition, including any endpoints and subranges therebetween.

In some exemplary embodiments, the asphalt composition further comprises various oils, fire retardant materials, and other compounds conventionally added to asphalt compositions for roofing applications. The barrier coating composition may optionally further comprise one or more other additives, such as rheology modifiers, UV absorbers/stabilizers, fire retardants, pigments, or additives to provide wettability. Other additives are contemplated and possible. The amounts of any such additives can vary depending on the particular embodiment and, in general, can be from 0.1 wt. % to 30 wt. %, including from 0.2 wt. % to 25 wt. %, from 0.5 wt. % to 20 wt. %, from 0.7 wt. % to 18 wt. %, from 1 wt. % to 15 wt. %, from 2 wt. % to 12 wt. %, from 2.5 wt. % to 10 wt. %, or from 5 wt. % to 8 wt. % of the barrier coating composition, based on the total solids present in the composition, including any endpoints and subranges therebetween.

The polymer, any film-forming additives, and any other additives can be dispersed in water and/or solvent and blended to form the barrier coating composition. As described above, the barrier coating composition is applied to at least one major surface of the polymeric foam product and is dried to form a barrier coating on the surface. In some exemplary embodiments, the barrier coating is formed directly on a surface of the polymeric foam product, without the use of adhesives, primers, or other layers between the barrier coating and the surface of the polymeric foam product. Thus, in any of the embodiments disclosed herein, the polymeric foam product is free of any polyamide primer coating that is applied to the foam product prior to the barrier coating composition.

Alternatively or additionally to the coating layer described above, the barrier coating composition may be injected into the extruder, such as through a port, and incorporated directly into the foamable composition.

The foamable polymer composition provides strength, flexibility, toughness, and durability to the final product. The foamable polymer composition is not particularly limited, and generally, any polymer capable of being foamed may be used as the foamable polymer in the resin mixture (referred to herein as the "matrix polymer"). The matrix polymer may be thermoplastic or thermoset. The particular polymer composition may be selected to provide sufficient mechanical strength and/or to the process utilized to form final foamed polymer products. In addition, the matrix polymer is preferably chemically stable, that is, generally non-reactive, within the expected temperature range during formation and subsequent use in a polymeric foam.

As used herein, the term "polymer" is generic to the terms "homopolymer," "copolymer," "terpolymer," and combinations of homopolymers, copolymers, and/or terpolymers. Non-limiting examples of suitable foamable polymers for use as the matrix polymer herein include alkenyl aromatic polymers, polyvinyl chloride ("PVC"), chlorinated polyvinyl chloride ("CPVC"), polyethylene, polypropylene, polycarbonates, polyisocyanurates, polyetherimides, polyamides, polyesters, polycarbonates, polymethylmethacrylate, polyacrylate, polyphenylene oxide, polyurethanes, phenolics, polyolefins, styrene acrylonitrile ("SAN"), acrylonitrile butadiene styrene, acrylic/styrene/acrylonitrile block terpolymer ("ASA"), polysulfone, polyurethane, polyphenylene sulfide, acetal resins, polyamides, polyaramides, polyimides, polyacrylic acid esters, copolymers of ethylene and propylene, copolymers of styrene and butadiene, copolymers of vinyl acetate and ethylene, rubber modified polymers, thermoplastic polymer blends, and combinations thereof.

In some exemplary embodiments, the foamable matrix polymer is an alkenyl aromatic polymer material. Suitable alkenyl aromatic polymer materials include alkenyl aromatic homopolymers and copolymers of alkenyl aromatic compounds and copolymerizable ethylenically unsaturated co-monomers. In addition, the alkenyl aromatic polymer material may include minor proportions of non-alkenyl aromatic polymers. The alkenyl aromatic polymer material may be formed of one or more alkenyl aromatic homopolymers, one or more alkenyl aromatic copolymers, a blend of one or more of each of alkenyl aromatic homopolymers and copolymers, or blends thereof with a non-alkenyl aromatic polymer.

Examples of alkenyl aromatic polymers include, but are not limited to, those alkenyl aromatic polymers derived from alkenyl aromatic compounds such as styrene, alpha-methylstyrene, ethylstyrene, vinyl benzene, vinyl toluene, chlorostyrene, and bromostyrene. In at least one embodiment, the alkenyl aromatic polymer is polystyrene.

In some embodiments, minor amounts of monoethylenically unsaturated monomers such as $C_2$ to $C_6$ alkyl acids and esters, ionomeric derivatives, and $C_2$ to $C_6$ dienes may be copolymerized with alkenyl aromatic monomers to form the alkenyl aromatic polymer. Non-limiting examples of copolymerizable monomers include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

In some embodiments, the matrix polymer may be formed substantially of (e.g., greater than 95 percent), and in certain exemplary embodiments, formed entirely of polystyrene. The matrix polymer may be present in the foamable polymer composition in an amount from about 60% to about 99% by weight, in an amount from about 60% to about 96% by weight, in an amount from about 70% to about 95% by weight, or in an amount from about 85% to about 94% by weight. In embodiments, the matrix polymer may be present in an amount from about 90% to about 99% by weight. As used herein, the terms "% by weight" and "wt. %" are used interchangeably and are meant to indicate a percentage based on 100% of the total weight of the dry components.

As described herein, in any of the exemplary embodiments, the barrier coating composition described herein may be incorporated into the foamable polymer composition. For example, instead of applying the barrier coating composition as a coating on at least one surface of the polymeric foam product, the barrier coating composition can be injected into the screw extruder 100. In embodiments in which the polymer of the barrier coating composition is a resin, the polymer may be introduced into the feed hopper 108 in pellet form. It should be appreciated that, when injected into the extruder, certain properties of the barrier coating composition may differ from those of a barrier coating composition intended for coating on a surface of the polymeric foam product, including, but not limited to, the viscosity of the coating composition and the solids loading of the barrier coating composition.

As indicated above, the polymeric foam is formed from a composition that contains a blowing agent composition. According to one aspect of the present invention, the blowing agent composition comprises one or more of: $CO_2$, fluorinated blowing agents, such as hydrofluorocarbons (HFCs), hydrochlorofluorocarbons, hydrofluoroethers, hydrofluoroolefins (HFOs), hydrochlorofluoroolefins (HCFOs), hydrobromofluoroolefins, hydrofluoroketones, hydrochloroolefins, and fluoroiodocarbons, alkyl esters, such as methyl formate, ethanol, water, hydrocarbons, or mixtures thereof. In other exemplary embodiments, the blowing agent comprises one or more of $CO_2$, ethanol, HFOs, HCFOs, HFCs, and mixtures thereof.

In any of the exemplary embodiments, the blowing agent composition may comprise a material having a low global warming potential ("GWP"), such as a fluorinated alkene, including, for example, hydrofluoroolefins (HFOs) and hydrochlorofluoroolefins (HCFOs). The hydrofluoroolefin blowing agent in the blowing agent composition of the present invention may include, for example, 3,3,3-trifluoropropene (HFO-1243zf); 2,3,3-trifluoropropene; (cis and/or trans)-1,3,3,3-tetrafluoropropene (HFO-1234ze), particularly the trans isomer; 1,1,3,3-tetrafluoropropene; 2,3,3,3-tetrafluoropropene (HFO-1234yf); (cis and/or trans)-1,2,3,3,3-pentafluoropropene (HFO-1225ye); 1,1,3,3,3-pentafluoropropene (HFO-1225zc); 1,1,2,3,3-pentafluoropropene (HFO-1225yc); hexafluoropropene (HFO-1216); 2-fluoropropene, 1-fluoropropene; 1,1-difluoropropene; 3,3-difluoropropene; 4,4,4-trifluoro-1-butene; 2,4,4,4-tetrafluoro-1-butene; 3,4,4,4-tetrafluoro-1-butene; octafluoro-2-pentene (HFO-1438); 1,1,3,3,3-pentafluoro-2-methyl-1-propene; octafluoro-1-butene; 2,3,3,4,4,4-hexafluoro-1-butene; 1,1,1,4,4,4-hexafluoro-2-butene (HFO-1336mzz); 1,2-difluoroethene (HFO-1132); 1,1,1,2,4,4-heptafluoro-2-butene; 3-fluoropropene, 2,3-difluoropropene; 1,1,3-trifluoropropene; 1,3,3-trifluoropropene; 1,1,2-trifluoropropene; 1-fluorobutene; 2-fluorobutene; 2-fluoro-2-butene; 1,1-difluoro-1-butene; 3,3-difluoro-1-butene; 3,4,4-trifluoro-1-butene; 2,3,3-trifluoro-1-butene; 1,1,3,3-tetrafluoro-1-butene; 1,4,4,4-tetrafluoro-1-butene; 3,3,4,4-tetrafluoro-1-butene; 4,4-difluoro-1-butene; 1,1,1-trifluoro-2-butene; 2,4,4,4-tetrafluoro-1-butene; 1,1,1,2-tetrafluoro-2 butene; 1,1,4,4,4-pentafluoro-1-butene; 2,3,3,4,4-pentafluoro-1-butene; 1,2,3,3,4,4,4-heptafluoro-1-butene; 1,1,2,3,4,4,4-heptafluoro-1-butene; and 1,3,3,3-tetrafluoro-2-(trifluoromethyl)-propene. In some exemplary embodiments, the blowing agent or co-blowing agents include HFO-1234ze and/or HFO-1336mzz.

In some exemplary embodiments, the fluorinated alkene blowing agent includes, for example, 1,1,1,4,4,4-hexafluoro-2-butene (HFO-1336mzz) (including cis (HFO- 1336mzz-Z) and/or trans (HFO-1336mzz-E) isomers thereof); and (cis and/or trans)-1,3,3,3-tetrafluoropropene (HFO-1234ze), particularly the trans isomer. HFO-1336mzz-Z has a GWP of 2 and an ozone depletion potential (ODP) of zero. HFO-1336mzz-Z is commercially available under the tradename Opteon™ 1100. Similarly, HFO-1234ze has a GWP of less than 1 and an ODP of zero. In some exemplary embodiments, the low GWP fluorinated alkene has a GWP of less than 50, such as less than 30, less than 25, less than 15, less than 10, less than 5, less than 2.5, or less than 1. In any of the exemplary embodiments, the blowing agent may comprise HFO-1336mzz-Z and is substantially free of additional fluorinated alkenes.

When included, the fluorinated alkene is present in the blowing agent composition in at least 5 wt. %, including at least 7 wt. %, at least 10 wt. %, at least 12 wt. %, at least 15 wt. %, at least 18 wt. %, at least 20 wt. %, at least 23 wt. %, at least 25 wt. %, at least 27 wt. %, and at least 30 wt. %. In any of the exemplary embodiments, the fluorinated alkene is present in the blowing agent composition in an amount no greater than 98%, including amounts no greater than 95 wt. %, no greater than 90 wt. %, no greater than 85 wt. %, no greater than 80 wt. %, no greater than 75 wt. %, no greater than 70 wt. %, no greater than 65 wt. %, no greater than 60 wt. %, no greater than 55 wt. %, no greater than 52 wt. %, no greater than 50 wt. %, no greater than 47 wt. %, no greater than 45 wt. %, no greater than 42 wt. %, no greater than 40 wt. %, no greater than 37 wt. %, no greater than 35 wt. %, no greater than 32 wt. %, no greater than 30 wt. %, and no greater than 25 wt. %. In any of the exemplary embodiments, the fluorinated alkene may be present in the blowing agent composition in an amount between 5 wt. % and 98 wt. %, including, for example, between 5 wt. % and 85 wt. %, between 5 wt. % and 75 wt. %, between 5 wt. % and 55 wt. %, between 10 wt. % and 50 wt. %, between 12 wt. % and 45 wt. %, and between 15 wt. % and 40 wt. %, including all endpoints and subranges therebetween.

The amount of fluorinated alkene may alternatively be characterized by the amount present in the foamable polymer composition. Thus, when characterized in this way, the fluorinated alkene may be present in the foamable polymer composition in at least 0.3 wt. %, including at least 0.5 wt. %, at least 0.7 wt. %, at least 1.0 wt. %, at least 1.2 wt. %, at least 1.5 wt. %, at least 2.0 wt. %, at least 2.3 wt. %, at least 2.5 wt. %, at least 2.7 wt. %, at least 3.0 wt. %, at least 3.5 wt. %, at least 3.7 wt. %, at least 3.9 wt. %, and at least 4.0 wt. %. In any of the exemplary embodiments, the fluorinated alkene may be present in the foamable polymer composition in an amount no greater than 10.0 wt. %, including amounts no greater than 8.0 wt. %, no greater than 6.0 wt. %, no greater than 4.5 wt. %, no greater than 4.0 wt. %, no greater than 3.8 wt. %, no greater than 3.5 wt. %, no greater than 3.2 wt. %, no greater than 3.0 wt. %, no greater than 2.8 wt. %, no greater than 2.5 wt. %, no greater than 2.3 wt. %, and no greater than 2.0 wt. %.

The amount of fluorinated alkene may alternatively be characterized by the molar amount per 100 grams of the of the matrix polymer. Thus, when characterized in this way the fluorinated alkene may be present in the foamable polymer composition in an amount less than 0.1 moles per 100 grams of the of the matrix polymer, including no greater than 0.05 moles, no greater than 0.03 moles, no greater than 0.02 moles, no greater than 0.018 moles, and no greater than 0.01 moles. In any of the exemplary embodiments, the fluorinated alkene may be present in foamable polymer composition in an amount between 0.0005 moles and less than 0.1 moles per 100 grams of the of the matrix polymer, including between 0.001 moles and 0.025 moles, between 0.005 moles and 0.02 moles, and between 0.01 moles and 0.015 moles per 100 grams of the of the matrix polymer, including all endpoints and subranges therebetween.

In various embodiments, the blowing agent composition may optionally include one or more blowing agents or co-blowing agents selected from the group consisting of hydrocarbons, hydrofluorocarbons ("HFC"), hydrochlorofluorocarbons ("HCFO"), carbon dioxide, methyl formate, methylal, and water.

In some exemplary embodiments, the blowing agent may comprise one or more hydrocarbons. Suitable hydrocarbons include, but are not limited to, C1 to C6 aliphatic hydrocarbons, such as methane, ethane, propane, n-butane, isobuatane, and neopentane, and C1 to C3 aliphatic alcohols, such as methanol, ethanol, n-propanol, and isopropanol.

In some exemplary embodiments, the blowing agent may comprise one or more hydrofluorocarbons. The specific hydrofluorocarbon utilized is not particularly limited. A non-exhaustive list of examples of suitable blowing HFC blowing agents include 1,1-difluoroethane (HFC-152a), 1,1,1,2-tetrafluoroethane (HFC-134a), 1,1,2,2-tetrafluoroethane (HFC-134), 1,1,1-trifluoroethane (HFC-143a), difluoromethane (HFC-32), 1,3,3,3-pentafluoropropane (HFO-1234ze), pentafluoro-ethane (HFC-125), fluoroethane (HFC-161), 1,1,2,2,3,3-hexafluoropropane (HFC-236ca), 1,1,1,2,3,3-hexafluoropropane (HFC-236ea), 1,1,1,3,3,3-hexafluoropropane (HFC-236fa), 1,1,1,2,2,3-hexafluoropropane (HFC-245ca), 1,1,2,3,3-pentafluoropropane (HFC-245ea), 1,1,1,2,3 pentafluoropropane (HFC-245eb), 1,1,1,3,3-pentafluoropropane (HFC-245fa), 1,1,1,4,4,4-hexafluorobutane (HFC-356mff), 1,1,1,3,3-pentafluorobutane (HFC-365mfc), and combinations thereof. In some exemplary embodiments, the blowing agent comprises HFC-152a. Exemplary HFC blowing agents or blends thereof are commercially available under the tradename FORMACEL™, including but not limited to FORMACEL™ B and FORMACEL™ Z6.

Exemplary blowing agent compositions comprise 15 wt. % to 60 wt. % of a fluorinated alkene selected from HFO-1336mzz and HFO-1234ze, or mixtures thereof, 40 wt. % to 85 wt. % of HFC-152a, and optionally carbon dioxide, based on the total weight of the blowing agent composition, including all endpoints and subranges therebetween. Stated differently, the exemplary blowing agent compositions may comprise 2.0 wt. % to 4.5 wt. % HFO-1336mzz, 3.5 wt. % to 5.0 wt. % HFC-152a, and optionally carbon dioxide, based on the total weight of the foamable polymeric composition, including compositions comprising 2.5 wt. % to 4.0 wt. % HFO-1336mzz, 4.2 wt. % to 4.9 wt. % HFC-152a, and optionally carbon dioxide, based on the total weight of the foamable polymeric composition. Further exemplary blowing agent compositions may comprise 3.0 wt. % to 5.0 wt. % HFO-1234ze, 2.5 wt. % to 4.5 wt. % HFC-152a, and optionally carbon dioxide, based on the total weight of the foamable polymeric composition, including compositions comprising 3.5 wt. % to 4.5 wt. % HFO-1234ze, 3.0 wt. % to 3.9 wt. % HFC-152a, and optionally carbon dioxide, based on the total weight of the foamable polymeric composition The blowing agent may also comprise one or more hydrochlorofluoroolefins (HCFO), such as HCFO-1233; 1-chloro-1,2,2,2-tetrafluoroethane (HCFC-124); 1,1-dichloro fluoroethane (HCFC-141b); 1,1,1,2-tetrafluoroethane (HFC-134a); 1,1,2,2-tetrafluoroethane (HFC-134); 1-chloro-1,1-difluoroethane (HCFC-142b); 1,1,1,3,3-pentafluorobutane (HFC-365mfc); 1,1,1,2,3,3,3-heptafluoropropane (HFC-227ea); tnchlorofluoromethane (CFC-11); dichlorodifluoromethane (CFC-12); and dichlorofluoromethane (HCFC-22).

The term "HCFO-1233" is used herein to refer to all trifluoromonochloropropenes. Among the trifluoromonochloropropenes are included both cis- and trans-1,1,1-trifluo-3,chlororopropene (HCFO-1233zd or 1233zd). The term "HCFO-1233zd" or "1233zd" is used herein generically to refer to 1,1,1-trifluo-3-chloro-propene, independent of whether it is the cis- or trans-form. The terms "cis HCFO-1233zd" and "trans HCFO-1233zd" are used herein to describe the cis- and trans-forms or trans-isomer of 1,1,1-trifluo,3-chlororopropene, respectively.

In some exemplary embodiments, the blowing agent composition includes two or more blowing agents, such as a hydrocarbon and carbon dioxide. In other exemplary embodiments, the blowing agent formulation may be free of carbon dioxide and/or water. In various exemplary embodiments, the blowing agent composition is free of a hydrofluorocarbon.

In some embodiments, the blowing agent comprises $CO_2$, optionally, one or more co-blowing agents (e.g., a hydrocarbon, an HFO, and/or HFC) and, optionally, one or more solubilizers (e.g., methyl formate, ethanol, isobutane, propylene carbonate, etc.). In some such embodiments, the $CO_2$ can be present in an amount of 25 wt. % or more, 50 wt. % or more, 60 wt. % or more, 70 wt. % or more, 80 wt. % or more, 90 wt. % or more, 95 wt. % or more, or even 98 wt. % or more based on a total weight of the blowing agent composition. Exemplary blowing agent compositions include 50 wt. % to 99 wt. % $CO_2$ and 1 wt. % to 20 wt. % of one or more hydrocarbons, such as isobutane, 65 wt. % to 98 wt. % $CO_2$ and 2.0 wt. % to 15 wt. % of one or more hydrocarbons, and 80 wt. % to 96 wt. % $CO_2$ and 3 wt. % to 12 wt. % of one or more hydrocarbons.

In some exemplary embodiments, the blowing agent is present in the blowing agent composition in at least 0.1 wt. %, including at least 1 wt. %, at least 5 wt. %, at least 10 wt. %, at least 15 wt. %, at least 17 wt. %, at least 20 wt. %, at least 25 wt. %, at least 28 wt. %, at least 30 wt. %, at least 33 wt. %, at least 35 wt. %, at least 40 wt. %, at least 43 wt. %, at least 45 wt. %, at least 47 wt. %, and at least 50 wt. %. The amount of blowing agent present in the blowing agent composition can vary depending on the particular embodiment. For example, blowing agents such as carbon dioxide or water may be included in small amounts because of their low solubility in polystyrene, while blowing agents with improved solubility in polystyrene may be included in larger amounts (e.g., at least 15 wt. %). However, in some embodiments, blowing agents such as carbon dioxide can be provided with a solubilizer to increase the solubility of the blowing agent in polystyrene. In any of the exemplary embodiments, the blowing agent is present in the blowing agent in an amount no greater than 75 wt. %, including amounts no greater than 70 wt. %, no greater than 67 wt. %, no greater than 65 wt. %, and no greater than 62 wt. %. In any of the exemplary embodiments, the blowing agent may be present in the blowing agent composition in an amount between 0.1 wt. % and 75 wt. %, including, for example, between 1 wt. % and 75 wt. %, between 5 wt. % and 75 wt. %, between 10 wt. % and 75 wt. %, between 25 wt. % and 75 wt. %, between 30 wt. % and 70 wt. %, between 32 wt. % and 67 wt. %, and between 36 wt. % and 63 wt. %.

When characterizing the blowing agent by its weight percent present in the foamable polymer composition, the blowing agent is present in at least 3.0 wt. %, including at least 3.2 wt. %, at least 3.5 wt. %, at least 3.7 wt. %, and at least 3.9 wt. %. In any of the exemplary embodiments, the blowing agent may be present in the foamable polymer composition in an amount no greater than 10.0 wt. %, including amounts no greater than 9.0 wt. %, no greater than 8.5 wt. %, no greater than 8.0 wt. %, no greater than 7.8 wt. %, no greater than 7.5 wt. %, no greater than 7.2 wt. %, no greater than 7.0 wt. %, no greater than 6.8 wt. %, no greater than 6.5 wt. %, no greater than 6.3 wt. %, no greater than 6.0 wt. %, no greater than 5.5 wt. %, no greater than 5.0 wt. %, no greater than 4.8 wt. %, no greater than 4.5 wt. %, no greater than 4.2 wt. %, no greater than 4.0 wt. %, and no greater than 3.9 wt. %.

The amount of blowing agent may alternatively be characterized by the molar amount per 100 grams of the of the matrix polymer. Thus, when characterized in this way the first blowing agent may be present in the foamable polymer composition in an amount between 0.001 moles and less than 0.1 moles per 100 grams of the of the matrix polymer, including between 0.01 moles and 0.09 moles, between 0.03 moles and 0.08 moles, and between 0.04 moles and 0.075 moles per 100 grams of the of the matrix polymer.

In embodiments in which the barrier coating composition is injected into the screw feeder or otherwise incorporated into the foamable polymeric mixture, it should be appreciated that water included in the barrier coating composition add to the amount and, thus, the blowing power, of the blowing agent.

It has been surprisingly discovered that the use of the barrier coating composition as described herein can enable use of a reduced amount of blowing agent to be incorporated into the foamable polymeric mixture and yield a foam product with an improved insulation value, as compared to an otherwise identical foam product without the barrier coating. For instance, blowing agent compositions (i.e., the total amount of all blowing agents) are typically present in a foamable mixture in an amount from about 6.0 wt. % to 12.0 wt. %, and more particularly in an amount from between 7.8 wt. % and 8.0 wt. %, based upon the total weight of the foamable polymeric mixture. However, in some exemplary embodiments, the total blowing agent composition present in the foamable polymeric mixture can be reduced to less than 7.6 wt. %, such as an amount from about 1% to about 6.8% by weight, and in some embodiments, from about 2% to about 6.65% by weight, or from about 2.5% to about 6.4% by weight (based upon the total weight of the foamable composition, excluding the blowing agent composition). In some exemplary embodiments, the total blowing agent composition is present in an amount from about 2.6 to about 4.5% by weight, including about 2.8 to about 4.2% by weight, based on the total weight of the foamable composition, excluding the blowing agent composition.

Optional additives such as infrared attenuating agents, processing aids, nucleating agents, plasticizing agents, pigments, elastomers, extrusion aids, antioxidants, fillers, antistatic agents, biocides, termite-ocide, surfactants, colorants, oils, waxes, flame retardant synergists, and/or UV absorbers/stabilizers may be incorporated into the foamable composition. These optional additives may be included in amounts necessary to obtain desired characteristics of the foamable gel or resultant extruded foam products. The additives may be added to the foamable composition or they may be incorporated in the foamable composition before, during, or after the polymerization process used to make the polymer.

As mentioned above, the foamable composition may further contain at least one infrared attenuating agent (IAA) to increase the R-value of the resulting foam product.

Non-limiting examples of suitable infrared attenuating agents for use in the present composition include graphite, including nanographite, carbon black, powdered amorphous carbon, asphalt, granulated asphalt, milled glass, talc, fiber glass strands, mica, black iron oxide, metal flakes (for example, aluminum flakes), carbon nanotube, nanographene platelets, carbon nanofiber, activated carbon, titanium dioxide, and combinations thereof. In some exemplary embodiments, the infrared attenuating agent is present in the foamable composition in an amount from 0 to 5.0% by weight of the total composition. In other embodiments, the infrared attenuating agent may be present in an amount from 0.05 to 3.0% by weight, from 0.08 to 2.0% by weight, or from 0.1 to 1.0% by weight. In some exemplary embodiments, the infrared attenuating agent is present in the composition in an amount less than or equal to 0.5% by weight.

In at least one exemplary embodiment, the infrared attenuating agent is nanographite. The nanographite can be multilayered by furnace high temperature expansion from acid-treated natural graphite or microwave heating expansion from moisture saturated natural graphite. In addition, the nanographite may be a multi-layered nanographite which has at least one dimension with a thickness less than 100 nm. In some exemplary embodiments, the graphite may be mechanically treated such as by air jet milling to pulverize the nanographite particles. The pulverization of the particles ensures that the nanographite flake and other dimensions of the particles are less than 150 microns.

The nanographite may or may not be chemically or surface modified and may be compounded in a polyethylene methyl acrylate copolymer (EMA), which is used both as a medium and a carrier for the nanographite. Other possible carriers for the nanographite include polymer carriers such as, but not limited to, polymethyl methacrylate (PMMA), polystyrene, polyvinyl alcohol (PVOH), and polyvinyl acetate (PVA). In exemplary embodiments, the nanographite is substantially evenly distributed throughout the foam. As used herein, the phrase "substantially evenly distributed" is meant to indicate that the substance (for example, nanographite) is evenly distributed or nearly evenly distributed within the foam.

Although the infrared attenuating agent increases the R-value for foams that include HFO and/or HFC blowing agents, the addition of infrared attenuating agents also tends to decrease the cell size of the cells in the foam, which results in undesirable final foamed products. In particular, small cell sizes tend to increase board bulk density, increase product cost, and reduce the process window during the extrusion process. However, it has been surprisingly discovered that the amount of infrared attenuating agent included in the foamable composition may be reduced, or eliminated when barrier coating compositions are applied to or within the polymer foam. Accordingly, in any of the exemplary embodiments, the foamable polymer composition and resulting foam product include less than 0.25 wt. % of an infrared attenuating agent, such as graphite, including less than 0.2 wt. %, less than 0.15 wt. %, less than 0.10 wt. %, and less than 0.05 wt. %. In any of the exemplary embodiments, the foamable polymer composition and resulting polymer foam are free of an infrared attenuating agent, such as graphite. It should be appreciated that such embodiments, a nucleator (e.g., inorganic substances such as talc, clay, and/or calcium carbonate) may be included in the foamable polymer composition to control the size of the foam cells.

The foamable composition may further contain a fire retarding agent in an amount up to 5.0% or more by weight. For example, fire retardant chemicals may be added in the extruded foam manufacturing process to impart fire retardant characteristics to the extruded foam products. Non-limiting examples of suitable fire retardant chemicals for use in the inventive composition include brominated aliphatic compounds such as hexabromocyclododecane (HBCD) and pentabromocyclohexane, brominated phenyl ethers, esters of tetrabromophthalic acid, halogenated polymeric flame retardant such as brominated polymeric flame retardant, phosphoric compounds, and combinations thereof.

Once the blowing agent composition, barrier coating composition, and optional additional additives have been introduced into the foamable polymer composition, the resulting mixture is subjected to some additional blending sufficient to distribute each of the additives generally uniformly throughout the polymer composition to obtain an extrusion or expandable composition.

The foamable polymer composition disclosed herein may produce a rigid, foamed polymeric insulation product via an extrusion process. Extruded foams have a cellular structure with cells defined by cell membranes and struts. Struts are formed at the intersection of the cell membranes, with the cell membranes covering interconnecting cellular windows between the struts.

In some exemplary embodiments, the polymeric insulation product has an average density of less than 10 pcf (pound per cubic foot), including less than 5 pcf, less than 3 pcf, and less than 2.5 pcf when produced at atmospheric conditions. However, the density may be less when the polymeric insulation product is produced under vacuum. In any of the exemplary embodiments, the polymeric insulation product has a density of 2.40 pcf or less, or 2.25 pcf or less, or 2.20 pcf or less, or 2.00 pcf or less, or 1.60 pcf or less. In any of the exemplary embodiments, the polymeric insulation product has an average density between 1.40 pcf and 2.40 pcf, including between 1.40 pcf and 2.25 pcf, between 1.40 pcf and 2.00 pcf, between 1.40 pcf and 1.60 pcf, between 1.45 pcf and 1.55 pcf, between 2.10 pcf and 2.30 pcf, and between 2.20 pcf and 2.28 pcf.

It is to be appreciated that the phrase "substantially closed cell" is meant to indicate that all or nearly all of the cells in the cellular structure of the polymer insulation product are closed. For example, "substantially closed cell" may be meant to indicate that not more than 30.0% of the cells are open cells, and particularly, not more than 10.0%, or more than 5.0% are open cells, or otherwise "non-closed" cells. The closed cell structure helps to increase the R-value of a formed, foamed insulation product. It is to be appreciated, however, that it is within the purview of various embodiments to produce an open cell structure, although such an open cell structure is not an exemplary embodiment.

The average cell size of the polymer insulation product may range from 0.005 mm (5 microns) to 0.6 mm (600 microns) and, in some exemplary embodiments, from 0.05 mm (50 microns) to 0.4 mm (400 microns), or from 0.1 mm (100 microns) to 0.2 mm (200 microns).

Additionally, the polymeric insulation product produced from the foamable polymer composition disclosed herein demonstrates insulation values (R-values) of greater than 4.0 per inch and maintains an R-value of at least 4.0 after 180 days. In any of the exemplary embodiments, the R-value is greater than 5.0 per inch, or greater than 6.0 per inch, or greater than 7.0 per inch. Accordingly, in some embodiments, the polymeric insulation product may comprise an R-value of 5.0 to greater than 7.0 or 8.0 per inch. The polymeric insulation product may be used to form a variety of products, such as a rigid insulation board, insulation foam, packaging product, building insulation, and underground insulation (for example, highway, airport runway, railway, and underground utility insulation).

The foamable polymer composition additionally may produce extruded foams that have a high compressive strength, which defines the capacity of a foam material to withstand axially directed pushing forces. In some exemplary embodiments, the foamable polymer composition has a compressive strength within the desired range for extruded foams, which is between about 6 and 120 psi. In some exemplary embodiments, the foamable polymer composition has a compressive strength between 10 and 110 psi, including between 20 and 100 psi, between 30 and 80 psi, and between 35 and 60 psi. In various exemplary embodiments, the foamable polymer composition has a compressive strength between 40 and 50 psi.

Accordingly, in any of the embodiments described herein, one or more additional coatings may be applied on the surface of the polymeric foam product. Such additional coatings may be added, for example, to enhance the properties of the barrier coating or to protect the barrier coating. In embodiments, the one or more additional coatings can impart hydrophobicity or water resistance to the coated polymeric foam product. It should be appreciated that the at least one additional coating can be formed by applying a coating composition to the surface and allowing the coating composition to dry, thereby forming the at least one additional coating. The coating composition can be, for example, a dispersion (e.g., aqueous or solvent-based), liquid, or the like.

As described above, the one or more additional coatings may be applied on top of the barrier coating, such that the barrier coating is positioned between the one or more additional coatings and the polymeric foam product. In other embodiments, the one or more additional coatings may be applied between the barrier coating and the surface of the polymeric foam product. The one or more additional coatings are not particularly limited and can be the same as or different from the barrier coating. In embodiments, the barrier coating is a first layer of a coating and the at least one additional coating is a second layer of the same coating. In embodiments, the barrier coating comprises a first polymer comprising polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof and the at least one additional coating comprises a different polymer comprising polyvinylidene dichloride (PVDC), polyvinyl alcohol, polyvinylidene fluoride (PVDF), polyvinyl chloride (PVC), ethylene vinyl alcohol, polyurethane, styrene butadiene (SBR), and combinations or copolymers thereof. In embodiments, the at least one additional coating comprises one or more polyurethanes, epoxies, acrylics, or combinations thereof.

The inventive concepts have been described above both generically and with regard to various exemplary embodiments. Although the general inventive concepts have been set forth in what is believed to be exemplary illustrative embodiments, a wide variety of alternatives known to those of skill in the art can be selected within the generic disclosure. Additionally, following examples are meant to better illustrate the present invention, but do in no way limit the general inventive concepts of the present invention.

Example 1

A barrier coating composition comprising an aqueous dispersion of SBR was brushed onto one or more surfaces of 1-inch samples of extruded polystyrene foam samples and dried to form the barrier coating. Locations of the application of the barrier coating composition are provided below in Table 1.

TABLE 1

Barrier coating locations on foam samples

| Sample | Coated Surfaces | 180-days k-value (Btu*in/h*ft$^2$*° F.) | R/in |
|---|---|---|---|
| Comp. Sample A | No coating | 0.1976 | 5.06 |
| Sample A | Top/bottom/4 edges | 0.1954 | 5.12 |
| Sample B | Top and bottom only | 0.1963 | 5.09 |
| Sample C | Top/bottom/3 edges | 0.1956 | 5.11 |
| Sample D | 4 edges only | 0.1981 | 5.05 |

Figure 2:
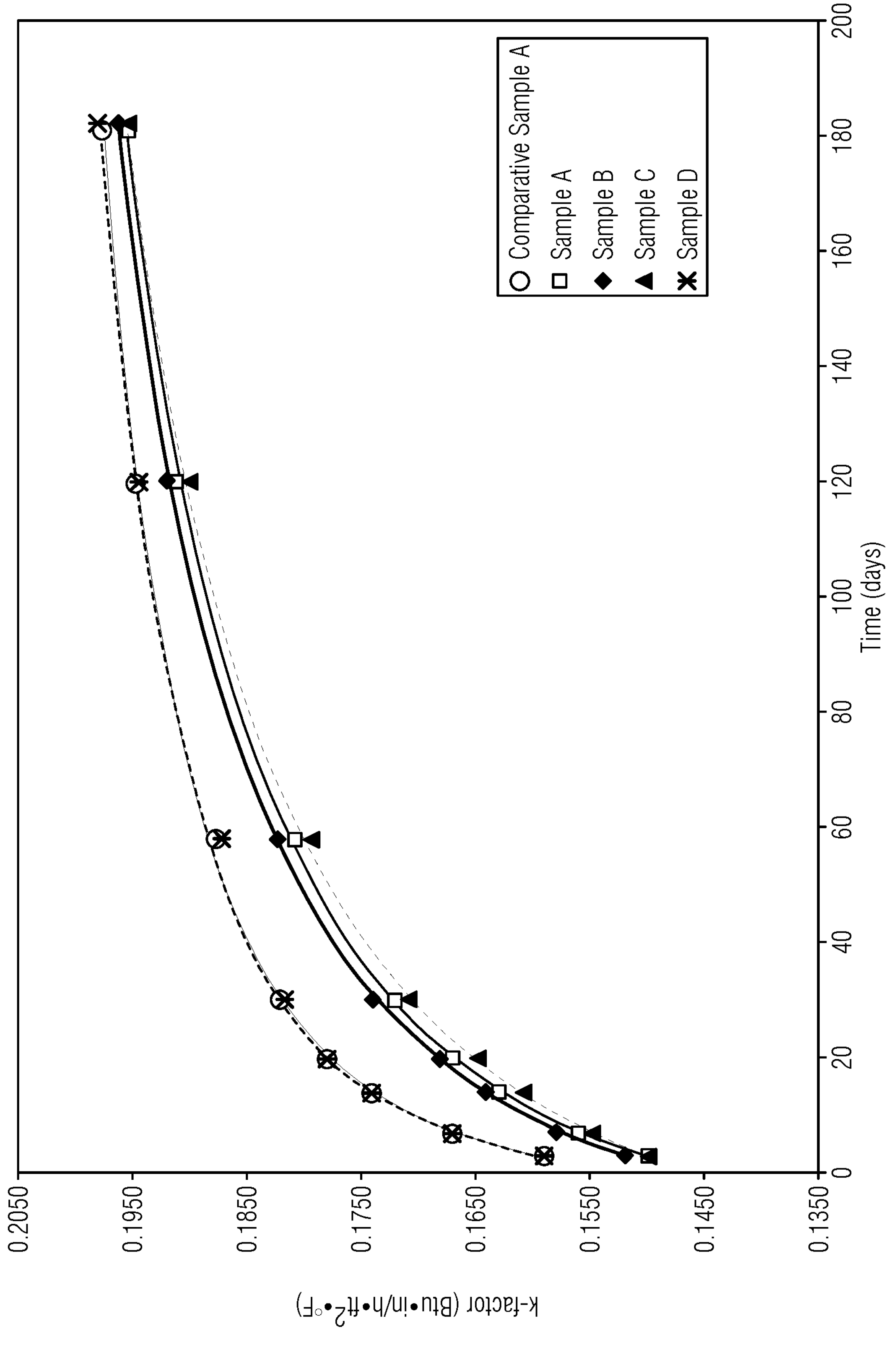
FIG. 2 is a graph showing the k-factor (y-axis) as a function of time (x-axis) for various barrier coating configurations according to Example 1.

As illustrated in FIG. 2, each of samples that had at least the top and bottom coated (Samples A-C) with the barrier coating composition exhibited improved thermal properties (lower k-value and increased R-value) as compared to the control sample (Comp. Sample A) and the sample with only the edges coated (Sample D).

Example 2

Extruded polystyrene foam samples were prepared using a co-rotating twin screw single screw tanden extrusion foam line. Polystyrene was melted in the extruder and mixed with an injected blowing agent composition to form a homogeneous foamable composition. The foamable composition (excluding the blowing agent) included 100 wt. % polystyrene, flame retardant masterbatch, and graphite masterbatch, and is reported as the "solids" in Table 2 below. An aqueous dispersion of SBR (50 wt. % solids in water) was injected directly into the extruder at various concentrations. A blowing agent blend was included in a constant amount across all samples. The foamable compositions were then extruded to produce 1-inch XPS foam samples. Each of the foamable compositions are provided below in Table 2.

TABLE 2

Foamable Compositions including Injected Barrier Coating Composition

| Sample | Solids (wt. %) | SBR (wt. %) |
|---|---|---|
| Comp. Sample B | 100 | 0.00 |
| Sample E | 99.95 | 0.05 |
| Sample F | 99.90 | 0.10 |
| Sample G | 99.85 | 0.15 |
| Sample H | 99.80 | 0.20 |
| Sample I | 99.75 | 0.25 |
| Sample J | 99.62 | 0.38 |
| Sample K | 99.50 | 0.50 |

Table 3, below, lists the properties of the resulting XPS foam samples.

TABLE 3

Properties of XPS foam samples

| Sample | Density (lb/ft$^3$) | 180-days k (Btu · in/h · ft$^2$ · ° F.) | 180-days R/in | Avg. Cell Sizes (mm) | Open Cells (%) | Compressive Strength (psi) | Compressive Modulus (psi) |
|---|---|---|---|---|---|---|---|
| Comp. Sample B | 2.27 | 0.1997 | 5.01 | 0.18 | 1.5 | 42.6 | 1180 |

TABLE 3-continued

Properties of XPS foam samples

| Sample | Density (lb/ft$^3$) | 180-days k (Btu · in/ h · ft$^2$ · ° F.) | 180-days R/in | Avg. Cell Sizes (mm) | Open Cells (%) | Compressive Strength (psi) | Compressive Modulus (psi) |
|---|---|---|---|---|---|---|---|
| Sample E | 2.24 | 0.1986 | 5.04 | 0.17 | 1.96 | 43.9 | 1187 |
| Sample F | 2.23 | 0.1991 | 5.02 | 0.17 | 0.44 | 44.7 | 1256 |
| Sample G | 2.17 | 0.1973 | 5.07 | 0.19 | 1.73 | 42.9 | 1269 |
| Sample H | 2.19 | 0.1983 | 5.04 | 0.17 | 1.19 | 44.3 | 1234 |
| Sample I | 2.19 | 0.1976 | 5.06 | 0.17 | 1.70 | 45.6 | 1352 |
| Sample J | 2.16 | 0.2011 | 4.97 | 0.17 | 0.36 | 47.3 | 1491 |
| Sample K | 2.30 | 0.2018 | 4.96 | 0.17 | 1.17 | 55.0 | 2015 |

Figure 3:
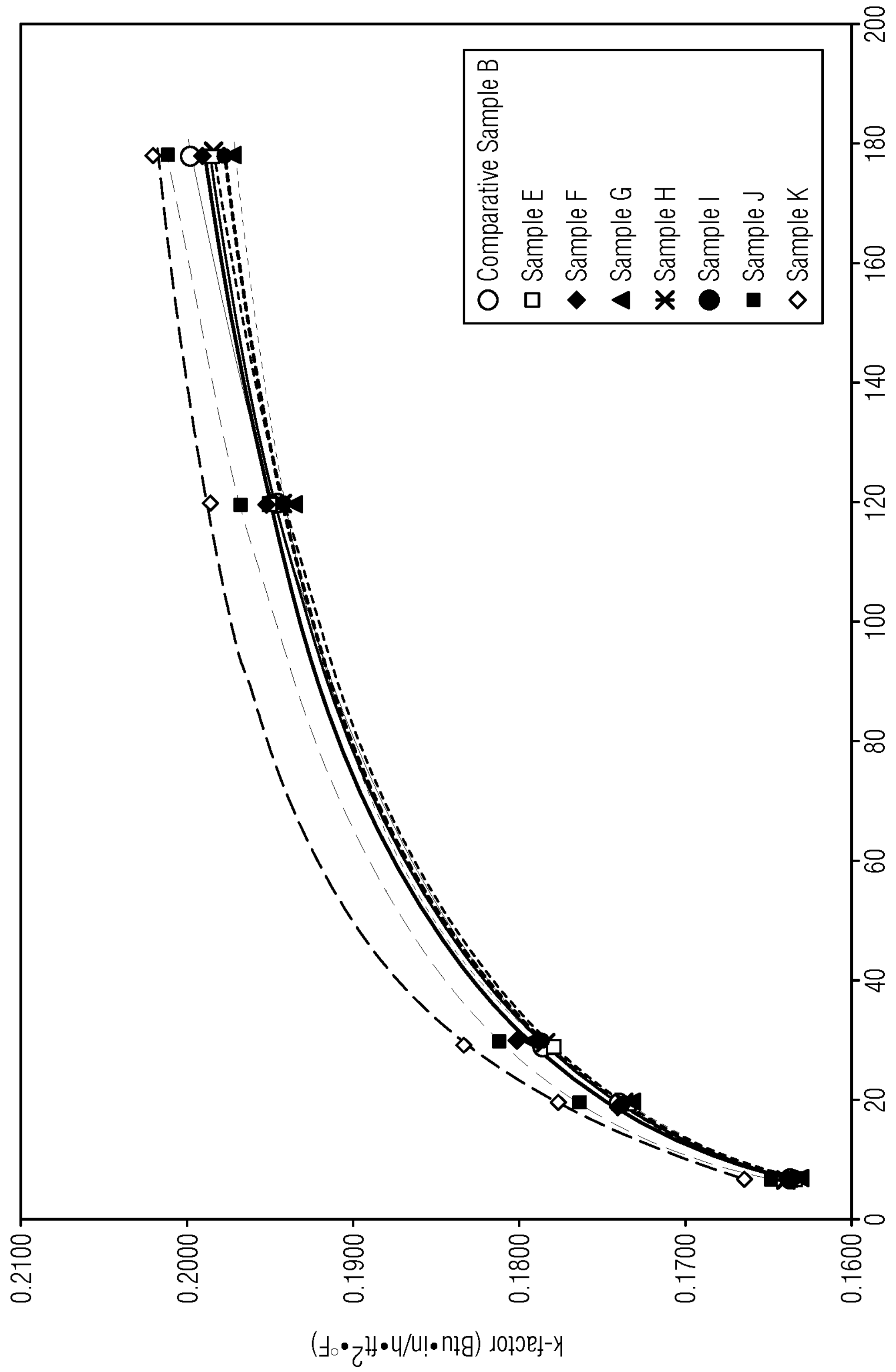
FIG. 3 is a graph showing the k-factor (y-axis) as a function of time (x-axis) for various concentrations of the barrier coating composition injected into the extrusion apparatus according to Example 2.

As shown in Table 3 and FIG. 3, XPS foam produced including SBR dispersion in amounts from 0.05 wt. % to 0.25 wt. % demonstrated improved insulation properties (e.g., a lower k-value) as compared to the control (Comp. Sample B). Additionally, the data presented in Table 3 illustrates that the barrier coating composition can be injected during the foaming process without negatively impacting the foam properties. For example, the compresive strength and compressive modulus for each of the examples was increased as compared to the control sample (Comp. Sample B).

Example 3

Varying amounts of one of two barrier coatings (an aqueous dispersion of ethylene vinyl alcohol (EVOH) or an aqueous dispersion of polyvinyl alcohol (PVOH)) were applied with a brush to various surfaces of 1-inch XPS foam samples. Locations of the application of the barrier coating composition are provided below in Table 4.

TABLE 4

Barrier coating locations on foam samples

| Sample | Coated Surfaces | Coating Composition | Coat Weight (g) | 180-days k-value (Btu*in/ h*ft$^2$*° F.) | R/in |
|---|---|---|---|---|---|
| Comp. Sample C | No coating | N/a | 0.00 | 0.2134 | 4.69 |
| Sample L | Light coat - Top/ bottom/4 edges | EVOH | 7.40 | 0.2077 | 4.81 |
| Sample M | Medium coat - Top/ 4 edges | EVOH | 18.01 | 0.1955 | 5.12 |
| Sample N | Medium coat - Top only | EVOH | 4.51 | 0.2087 | 4.79 |
| Sample O | Heavy coat - top/ bottom/4 edges | EVOH | 17.30 | 0.1910 | 5.24 |
| Sample P | Light coat - Top/ bottom/4 edges | PVOH | 8.39 | 0.1860 | 5.38 |
| Sample Q | Medium coat - Top/ 4 edges | PVOH | 11.23 | 0.1787 | 5.60 |
| Sample R | Medium coat - Top only | PVOH | 7.98 | 0.1736 | 5.76 |
| Sample S | Heavy coat - top/ bottom/4 edges | PVOH | 8.00 | 0.1959 | 5.11 |

Figure 4:
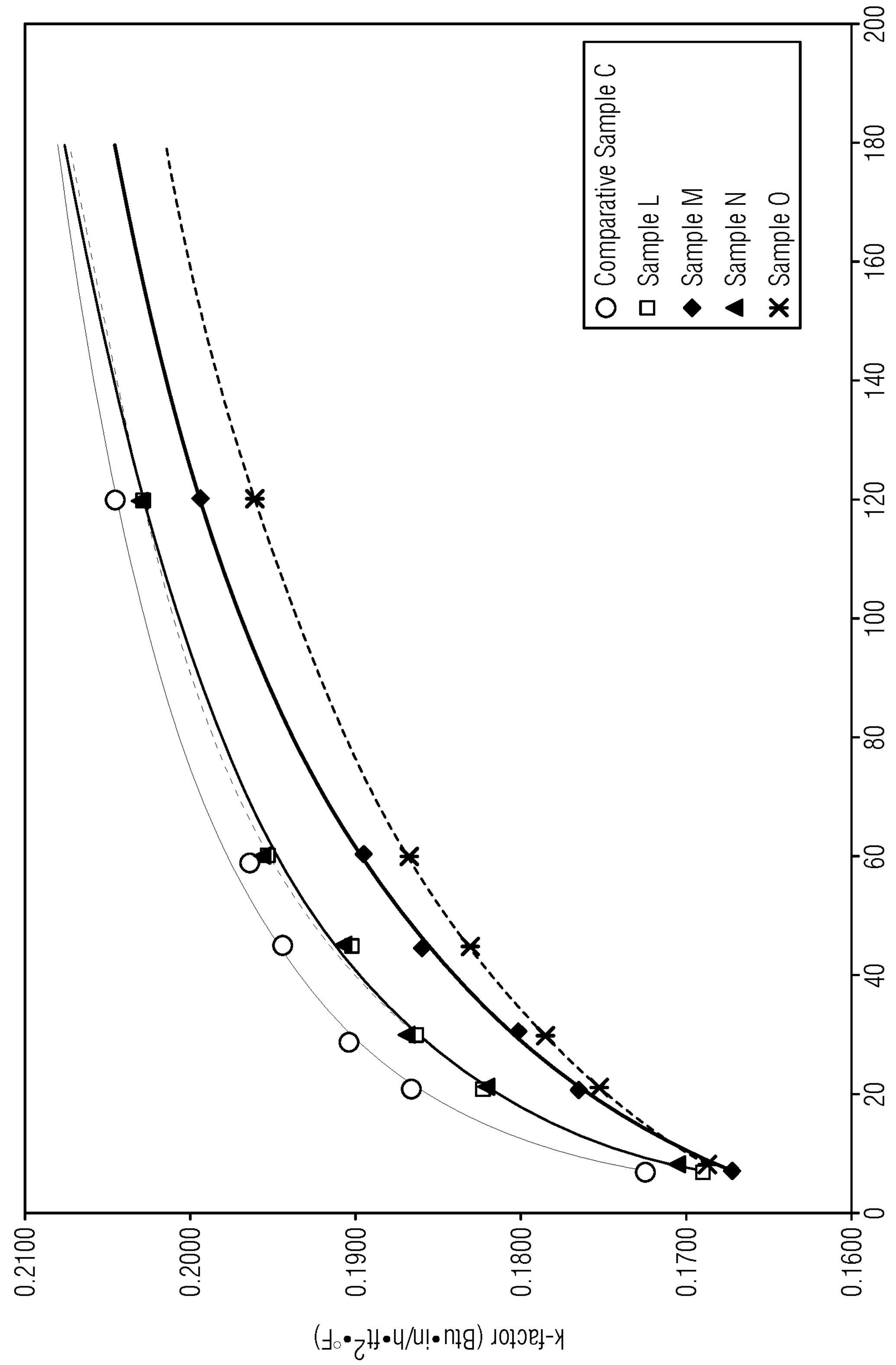
FIG. 4 is a graph showing the k-factor (y-axis) as a function of time (x-axis) for various barrier coating configurations with Coating A according to Example 3.
Figure 5:
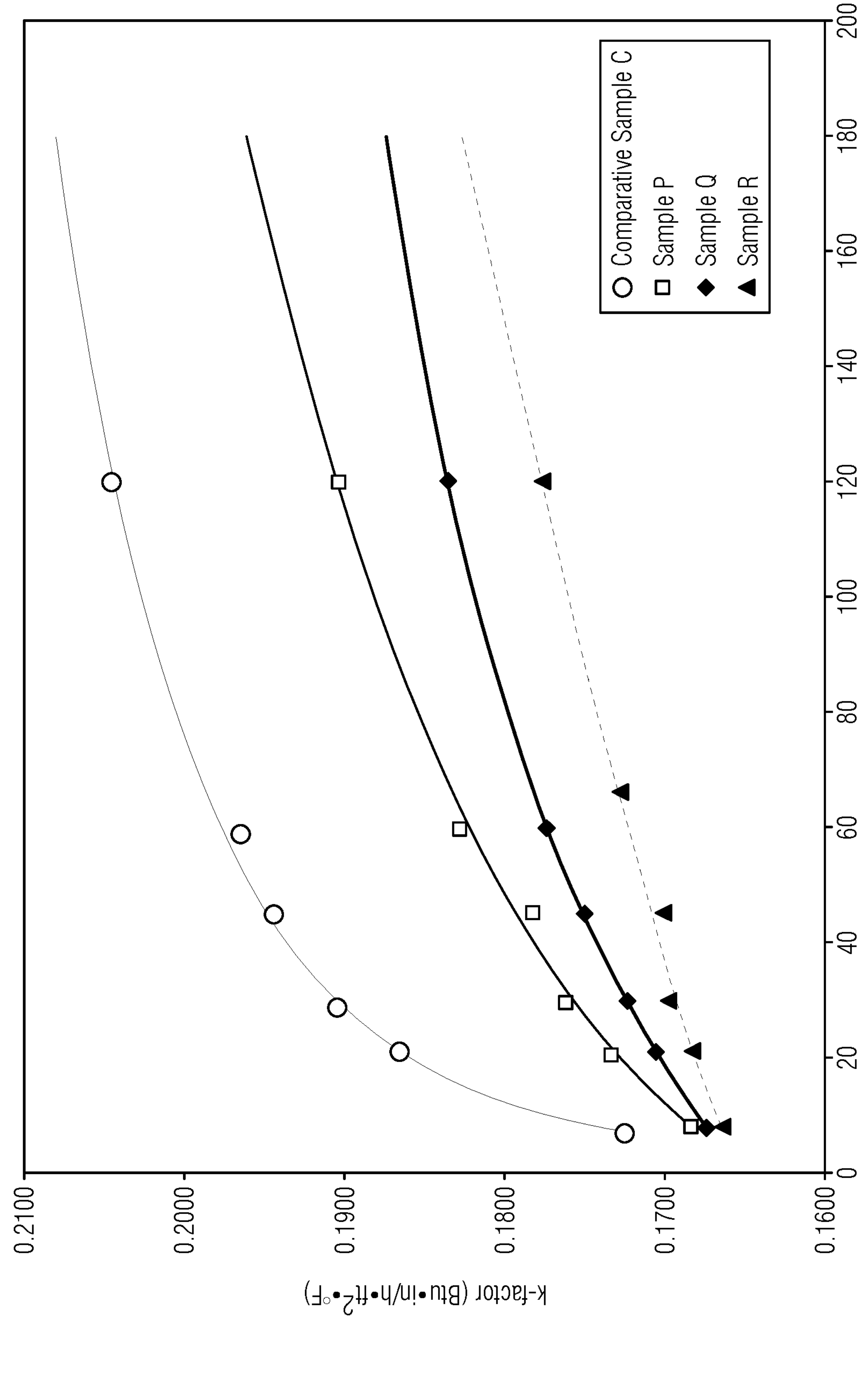
FIG. 5 is a graph showing the k-factor (y-axis) as a function of time (x-axis) for various barrier coating configurations with Coating B according to Example 3.

As shown in Table 4 and FIGS. 4-5, both the EVOH and PVOH coatings were effective at significantly slowing the diffusion rates of the blowing agents, as indicated by the improved R values and reduced 180 day k-values, as compared to the control (Comp. Sample C). For Sample R, PVOH improved the R value of the foam sample by about 23%, as compared to the control (Comp. Sample C).

Example 4

Extruded polystyrene foam samples were prepared using a co-rotating twin screw single screw tanden extrusion foam line. Polystyrene was melted in the extruder and mixed with an injected blowing agent composition to form a homogeneous foamable composition. The foamable composition for Comparative Samples E-H and Samples T-W (excluding the blowing agent) included 100 wt. % polystyrene and flame retardant masterbatch. The foamable composition for Comparative Samples D and I and Samples X and Y (excluding the blowing agent) included 100 wt. % polystyrene, flame retardant masterbatch, and graphite masterbatch. A blowing agent blend was included at a constant total amount across all samples. The blowing agent blend included a fluorinated alkene and an HFC at a constant ratio of 38/62, with the remainder of the blowing agent blend being $CO_2$. As the amount of fluorinated alkene and HFC were reduced, the amount of $CO_2$ was increased to maintain a constant level of total blowing agent. The foamable compositions were then extruded to produce 1-inch XPS foam samples, each having a density of 1.83 pcf.

For coated samples, PVOH (an aqueous dispersion of polyvinyl alcohol) was applied. Properties of each of the samples are provided in Table 5 below.

TABLE 5

Properties of XPS samples with PVOH coating

| Sample | Graphite | Coating Composition | Fluorinated Alkene (wt. %) | 180-days k-value (Btu*in/ h*ft$^2$*° F.) | R/in |
|---|---|---|---|---|---|
| Comp. Sample D | Yes | None | 3.0 | 0.2009 | 4.98 |
| Comp. Sample E | No | None | 3.0 | 0.2090 | 4.79 |
| Comp. Sample F | No | None | 2.5 | 0.2139 | 4.67 |
| Comp. Sample G | No | None | 2.0 | 0.2195 | 4.56 |
| Comp. Sample H | No | None | 1.5 | 0.2247 | 4.45 |
| Sample T | No | Yes | 3.0 | 0.1811 | 5.52 |
| Sample U | No | Yes | 2.5 | 0.1802 | 5.55 |
| Sample V | No | Yes | 2.0 | 0.1892 | 5.28 |
| Sample W | No | Yes | 1.5 | 0.2026 | 4.94 |
| Comp. Sample I | Yes | No | 1.5 | 0.2141 | 4.67 |
| Sample X | Yes | Yes | 3.0 | 0.1792 | 5.79 |
| Sample Y | Yes | Yes | 1.5 | 0.1834 | 5.45 |

Figure 6:
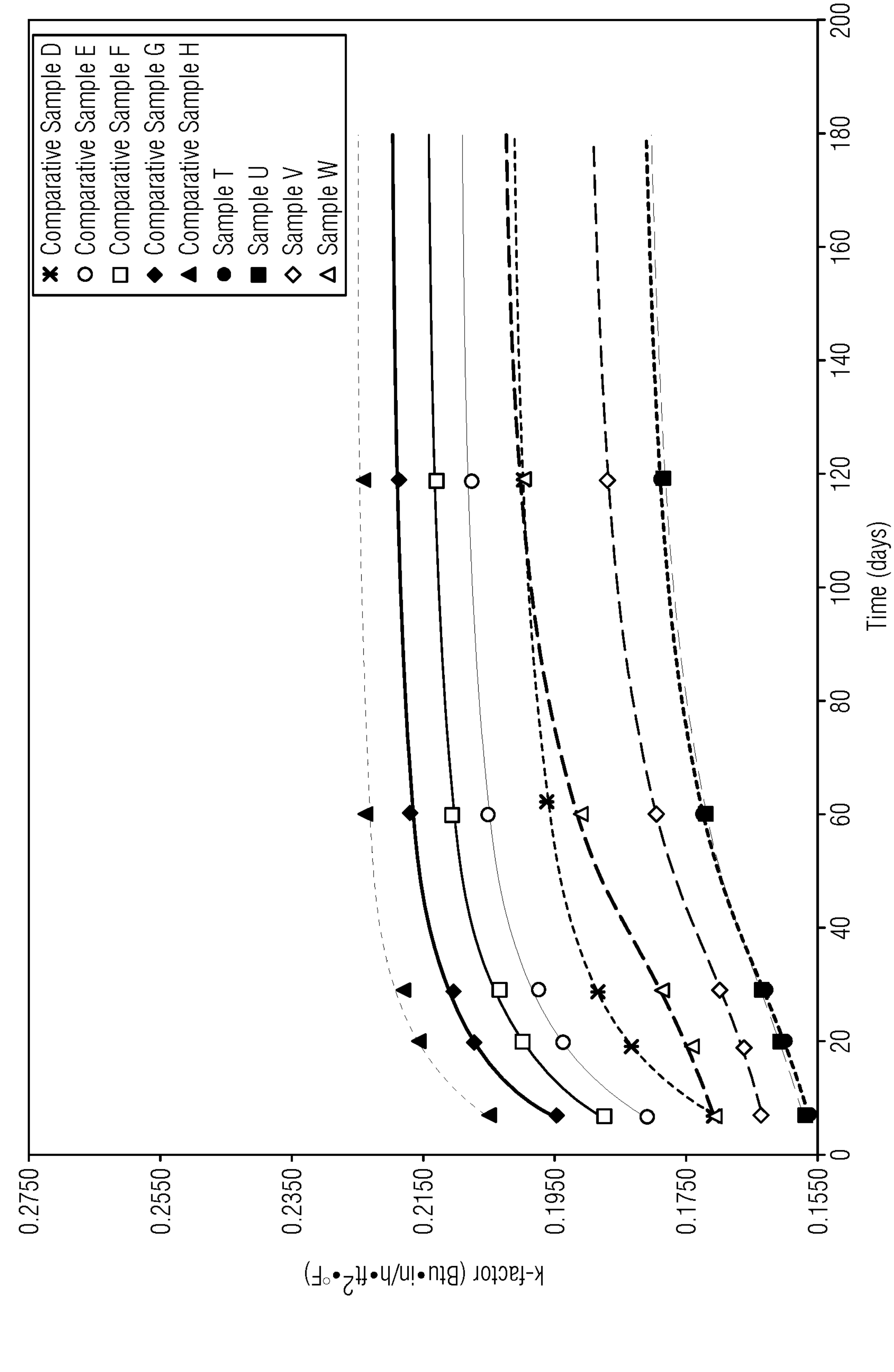
FIG. 6 is a graph showing the k-factor (y-axis) as a function of time (x-axis) for various barrier coating configurations according to Example 4.
Figure 7:
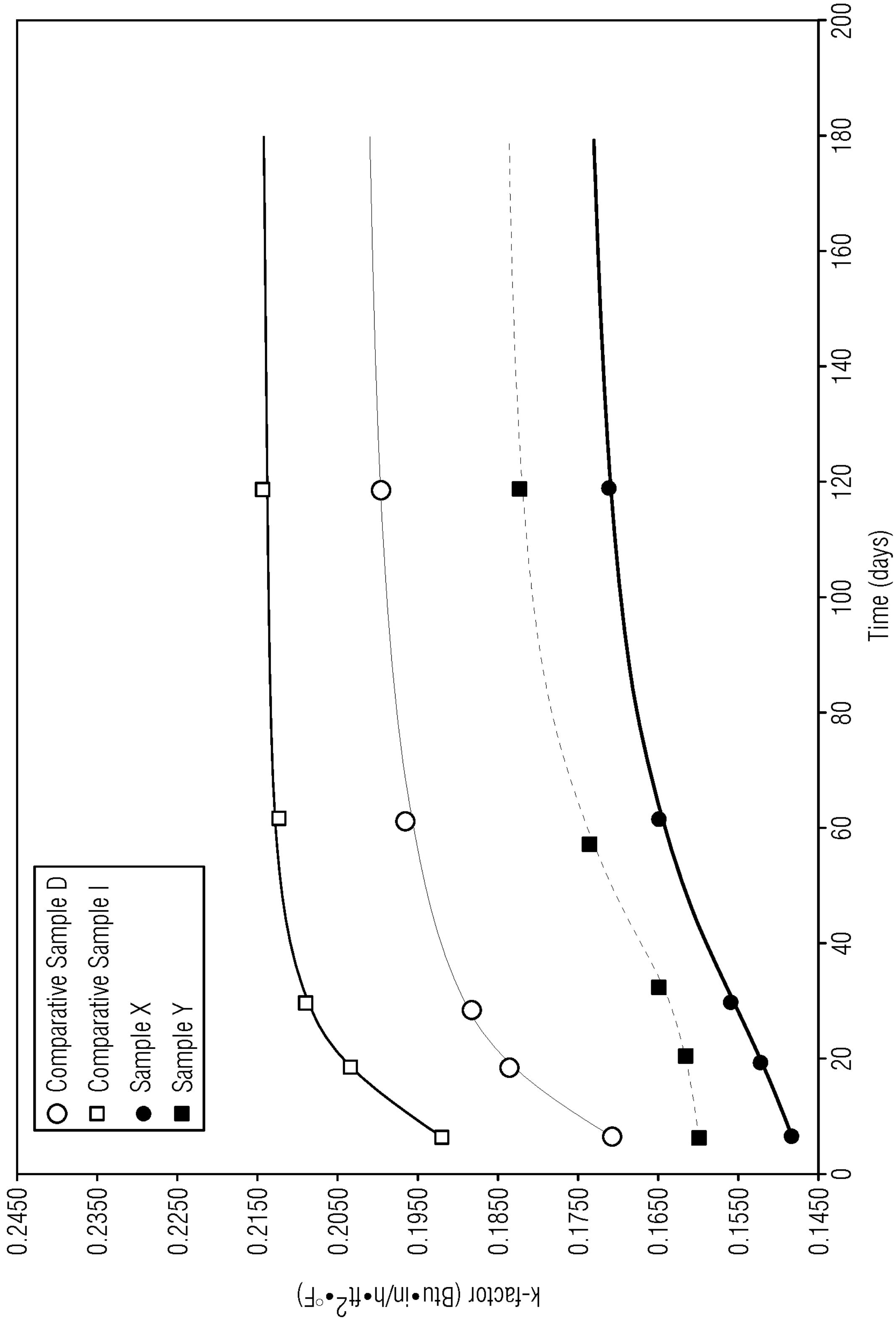
FIG. 7 is a graph showing the k-factor (y-axis) as a function of time (x-axis) for various barrier coating configurations according to Example 4.

As shown in FIG. 6, the removal of graphite from the foam composition led to an increased k-factor (Comparative Samples E-H as compared to Comparative Sample D), with an increased amount of fluorinated alkene blowing agent having less of an increase. However, the use of a PVOH coating on the foam (Samples T-W) reduced the k-factor to an amount below the control (Comparative Sample D). As shown in FIG. 7, the PVOH coating also provides improved insulation properties for foams including graphite (Samples X and Y).

Notably, in FIGS. 6 and 7, a combination of a PVOH coating with increased levels of fluorinated alkene blowing agent yielded the greatest improvement in insulation properties. However, FIGS. 6 and 7 demonstrate that less blowing agent can be used to achieve the same or improved insulation properties.

Example 5

Various coatings and coating combinations were applied to 1-inch XPS foam samples, as set forth in Table 6 below. PUD 1 and PUD 2 are two different commercially available polyurethane dispersions. For Samples BB and CC, the PVOH coating system was applied to the foam surface first and allowed to dry and then the PUD 1 or PUD 2 were applied to the top of the PVOH coating.

TABLE 6

Thermal properties of XPS samples with various coating systems

| Sample | Coating | 180-days k-value (Btu*in/h*ft$^2$*° F.) | R/in |
|---|---|---|---|
| Comp. Sample J | None | 0.2078 | 4.81 |
| Sample AA | PVOH | 0.1901 | 5.26 |
| Comp. Sample K | PUD1 | 0.2084 | 4.80 |
| Comp. Sample L | PUD2 | 0.2086 | 4.79 |
| Sample BB | PVOH + PUD1 | 0.1759 | 5.69 |
| Sample CC | PVOH + PUD2 | 0.1795 | 5.57 |

Figure 8:
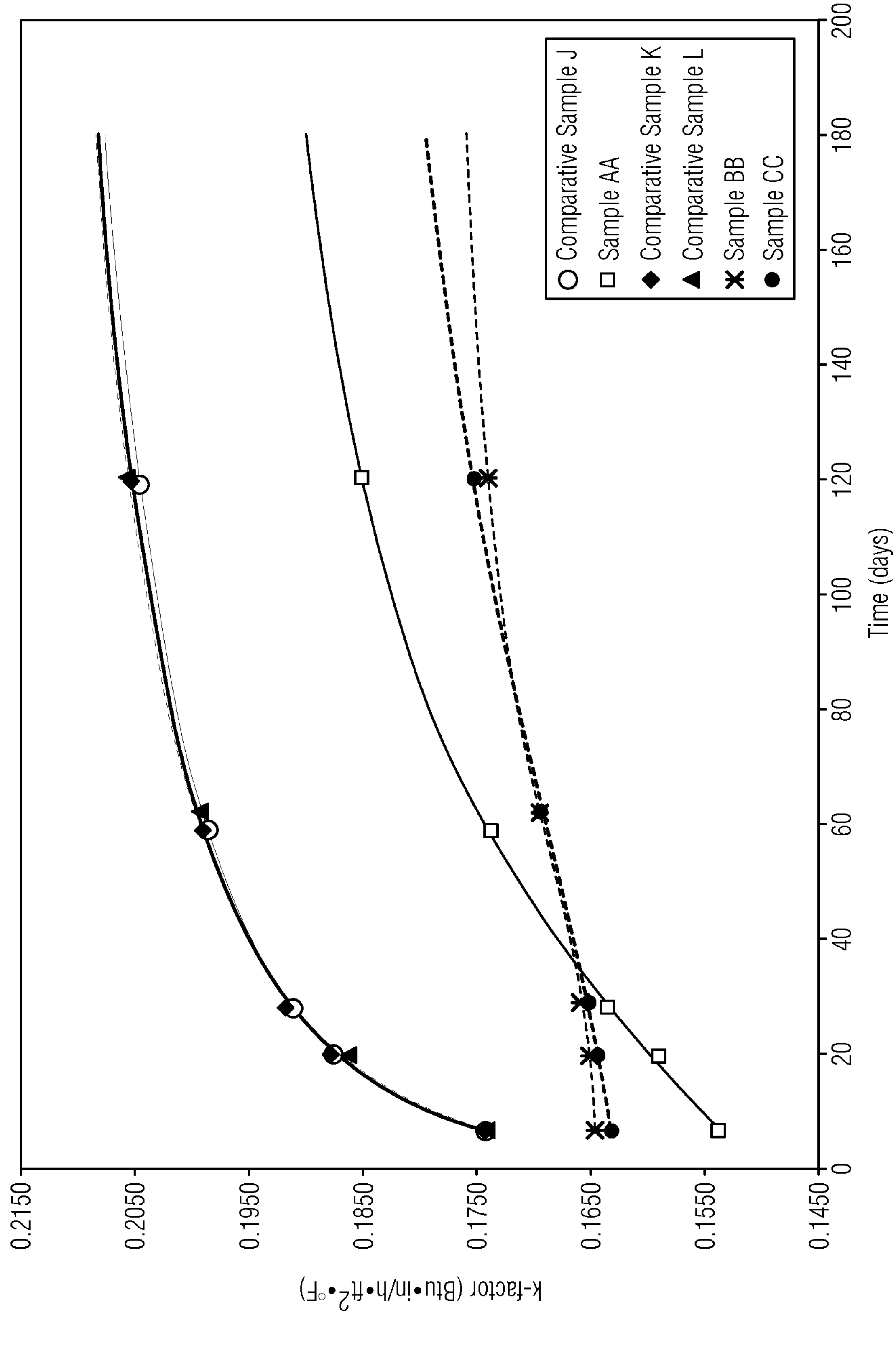
FIG. 8 is a graph showing the k-factor (y-axis) as a function of time (x-axis) for various barrier coating configurations according to Example 5.

As shown in FIG. 8, the PUD 1 and PUD 2 applied coatings by themselves (Comp. Samples K and L, respectively) did not provide any barrier properties to the foam. However, when applied to the surface of the applied PVOH coating (Samples BB and CC, respectively), they enhanced the barrier properties of the PVOH coating (Sample AA). Without being bound by theory, it is believed that the application of a PUD or hydrophobic coating to a PVOH or EVOH coating, which tend to be more hydrophilic and susceptible to moisture, may protect the hydrophilic coating and enhance the resistant properties of the hydrophilic coating.

Example 6

DIOFAN® A050 (a PVDC dispersion containing about 58 wt. % solids commercially available from Solvay) was applied as a barrier coating with a brush to various surfaces of 1-inch XPS foam samples at various coat weights, as set forth in Table 7 below.

TABLE 7

| Sample | Coating | Coating Weight (g) | 180-days k-value (Btu*in/h*ft$^2$*° F.) | R/in |
|---|---|---|---|---|
| Comp. Sample M | No Coating | — | 0.2017 | 4.96 |
| Sample DD | PVDC | 2.32 | 0.1969 | 5.08 |
| Sample EE | PVDC | 4.71 | 0.1790 | 5.59 |
| Sample FF | PVDC | 7.12 | 0.1538 | 6.50 |

Figure 9:
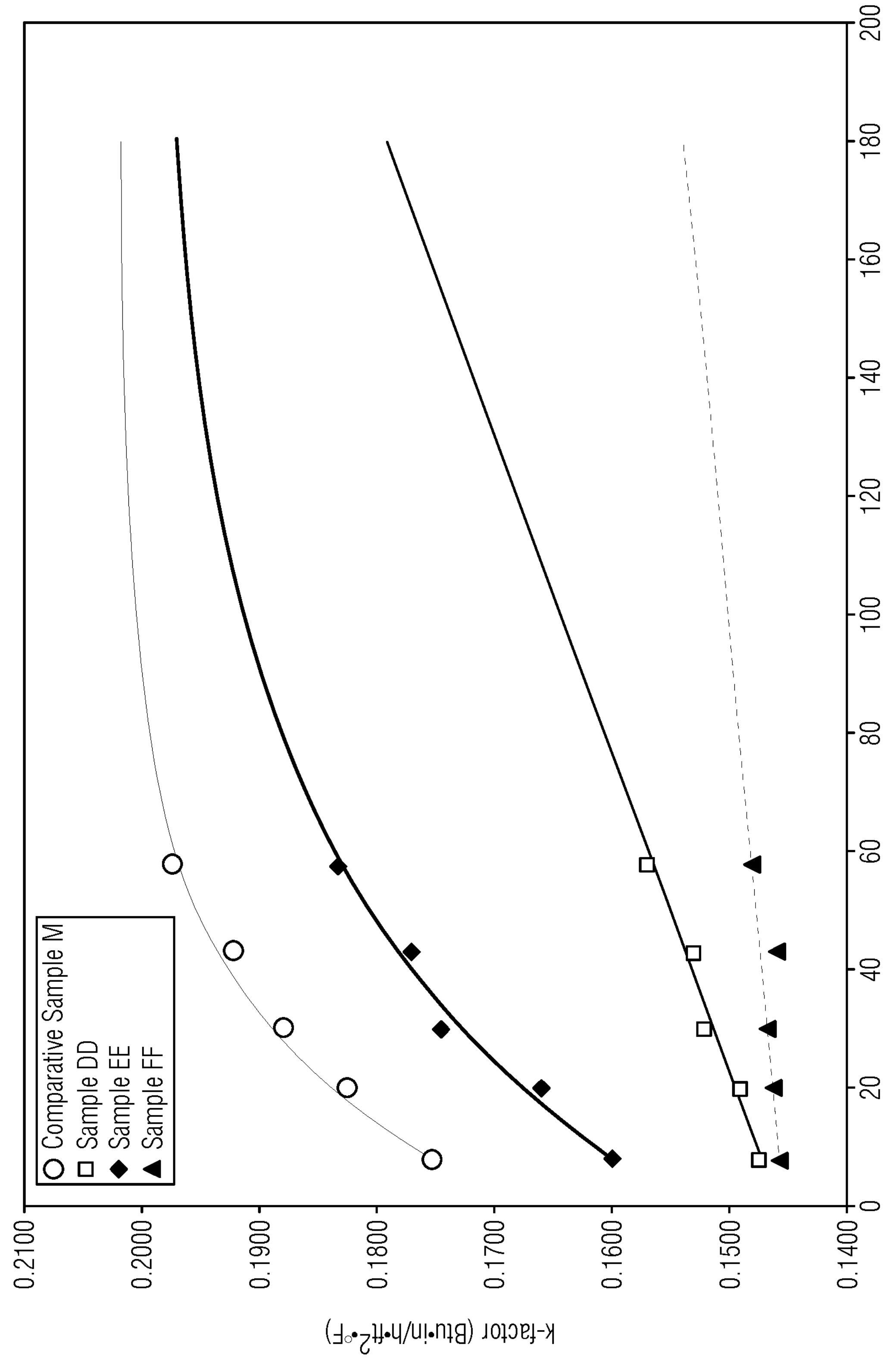
FIG. 9 is a graph showing the k-factor (y-axis) as a function of time (x-axis) for various PVDC coat weight configurations according to Example 6.

As shown in Table 7 and FIG. 9, the effectiveness of the PVDC coating at significantly slowing the diffusion rates of the blowing agents increased with increased coating weight, as indicated by the improved R values and reduced 180 day k-values, as compared to the control (Comparative Sample M).

Example 7

Extruded polystyrene foams including various blowing agent compositions were prepared and coated using a barrier coating composition to evaluate the effects of the barrier coating on the thermal conductivity properties of the foams. Each of the foamable compositions are provided below in Table 8.

TABLE 8

| Sample | $CO_2$ (wt. %) | Iso-butane (wt. %) | Total Blowing Agent (wt. %) | IAA (wt. %) | Flame Retar-dant (wt. %) | Density (lb/ft$^3$) |
|---|---|---|---|---|---|---|
| Comp. Sample N | 6.62 | 1.00 | 7.62 | 0.50 | 1.00 | 2.71 |
| Comp. Sample O | 6.62 | 0.75 | 7.37 | 0.50 | 1.00 | 2.57 |
| Comp. Sample P | 6.62 | 0.50 | 7.12 | 0.50 | 1.00 | 2.41 |
| Comp. Sample Q | 6.62 | 0.25 | 6.87 | 0.50 | 1.00 | 2.31 |
| Comp. Sample R | 6.62 | 0.13 | 6.75 | 0.50 | 1.00 | 2.16 |
| Sample GG | 6.62 | 1.00 | 7.62 | 0.50 | 1.00 | 2.05 |
| Sample HH | 6.62 | 0.75 | 7.37 | 0.50 | 1.00 | 2.71 |
| Sample II | 6.62 | 0.50 | 7.12 | 0.50 | 1.00 | 2.57 |
| Sample JJ | 6.62 | 0.25 | 6.87 | 0.50 | 1.00 | 2.41 |
| Sample KK | 6.62 | 0.13 | 6.75 | 0.50 | 1.00 | 2.31 |
| Sample LL | 6.62 | 0.50 | 7.12 | 0.50 | 1.00 | 2.16 |
| Sample MM | 6.62 | 0.50 | 7.12 | 0.50 | 1.00 | 2.05 |
| Sample NN | 6.62 | 0.50 | 7.12 | 0.50 | 1.00 | 1.94 |
| Sample OO | 6.62 | 0.50 | 7.12 | 0.50 | 1.00 | 1.83 |
| Sample PP | 6.62 | 0.50 | 7.12 | 0.50 | 1.00 | 1.72 |

To Samples GG-KK, a barrier coating including DIOFAN® A050 was applied to all surfaces of the foam sample, including the edges. Comparative Samples N-R were control samples, and no coating was applied. Sample LL had a DIOFAN® A050 coating applied to the major surfaces (e.g., top and bottom), but not the edges. Samples MM-00 had the coating applied to the top and bottom and one side, two sides, and three sides, respectively. Sample PP had the coating applied to only the four sides. Weights of the foam samples having a barrier coating applied, pre- and post-coating, are provided in Table 9.

TABLE 9

| Sample | Foam Sample (g) | Coat 1 + Foam (g) | Coat 1 weight (g) | Coats 1 and 2 + Foam (g) | Total coat weight (g) |
|---|---|---|---|---|---|
| GG | 62.49 | 64.29 | 1.80 | 68.10 | 5.61 |
| HH | 62.73 | 65.83 | 3.10 | 68.93 | 6.23 |
| II | 62.48 | 64.88 | 2.40 | 67.64 | 5.16 |
| JJ | 66.53 | 67.62 | 1.09 | 70.09 | 3.56 |
| KK | 62.63 | 65.68 | 3.05 | 68.84 | 6.21 |
| LL | 61.75 | 63.51 | 1.76 | 65.76 | 4.01 |
| MM | 61.91 | 64.16 | 2.25 | 66.49 | 4.58 |
| NN | 62.14 | 64.32 | 2.18 | 66.83 | 4.69 |
| OO | 61.13 | 63.41 | 2.28 | 65.15 | 4.02 |
| PP | 61.00 | 61.68 | 0.68 | 62.29 | 1.29 |

For each of Comparative Samples N-R and Samples GG-PP, the thermal conductivity was measured at 7 (Comp. Samples N-R and Samples GG-LL) or 8 days (Samples MM-PP) ($k_7$), 20 days ($k_{20}$), 28 days ($k_{30}$), 58 (Comp. Samples N-Q) or 59 days (Comp. Sample R and Samples GG-PP) ($k_{60}$), and 118 days ($k_{120}$). The k-values (Btu·in/h·ft$^2$·° F.) are reported in Table 10. Expected R-values at 180 days were calculated based on the regression of the measured thermal conductivities, and are also reported in Table 10.

TABLE 10

| Sample | $k_7$ | $k_{20}$ | $k_{30}$ | $k_{60}$ | $k_{120}$ | R value |
|---|---|---|---|---|---|---|
| Comp. Sample N | 0.2123 | 0.2169 | 0.2167 | 0.2167 | 0.2178 | 4.59 |

TABLE 10-continued

| Sample | $k_7$ | $k_{20}$ | $k_{30}$ | $k_{60}$ | $k_{120}$ | R value |
|---|---|---|---|---|---|---|
| Comp. Sample O | 0.2108 | 0.2159 | 0.2159 | 0.2162 | 0.2172 | 4.60 |
| Comp. Sample P | 0.2153 | 0.2188 | 0.2183 | 0.2183 | 0.2191 | 4.56 |
| Comp. Sample Q | 0.2205 | 0.2226 | 0.2219 | 0.2219 | 0.2224 | 4.50 |
| Comp. Sample R | 0.2218 | 0.2229 | 0.2222 | 0.2225 | 0.2226 | 4.49 |
| Sample GG | 0.1744 | 0.1905 | 0.1984 | 0.2080 | 0.2130 | 4.70 |
| Sample HH | 0.1671 | 0.1744 | 0.1838 | 0.2029 | 0.2106 | 4.72 |
| Sample II | 0.1699 | 0.1831 | 0.1914 | 0.2056 | 0.2116 | 4.69 |
| Sample JJ | 0.1809 | 0.2089 | 0.2140 | 0.2186 | 0.2205 | 4.55 |
| Sample KK | 0.1695 | 0.1901 | 0.2043 | 0.2199 | 0.2214 | 4.48 |
| Sample LL | 0.1673 | 0.1750 | 0.1811 | 0.1994 | 0.2086 | 4.68 |
| Sample MM | 0.1673 | 0.1749 | 0.1846 | 0.2039 | 0.2106 | 4.67 |
| Sample NN | 0.1702 | 0.1822 | 0.1920 | 0.2066 | 0.2122 | 4.68 |
| Sample OO | 0.1946 | 0.2110 | 0.2134 | 0.2164 | 0.2184 | 4.60 |
| Sample PP | 0.2150 | 0.2184 | 0.2185 | 0.2187 | 0.2193 | 4.57 |

Figure 10:
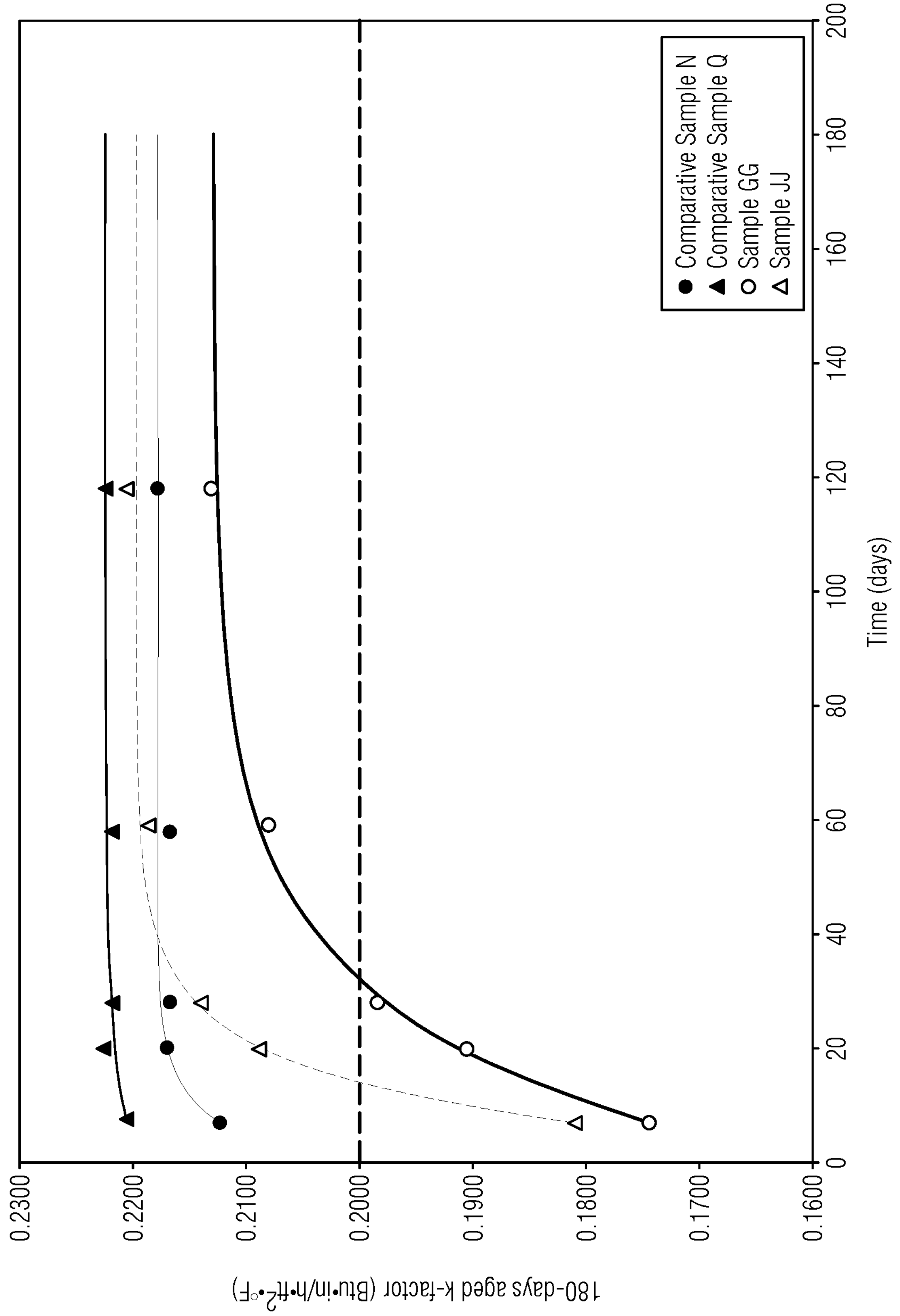
FIG. 10 is a graph showing the k-factor (y-axis) as a function of time (x-axis) for various samples according to Example 7.

FIG. 10 illustrates the measured thermal conductivity (k-factor) (y-axis) as a function of time in days (x-axis) for samples including blowing agents comprising both 1 wt. % isobutane and 0.25 wt. % isobutane, both with and without the barrier coating (Comparative Samples N and Q and Samples GG and JJ). As can be seen in Table 10 and FIG. 10, the application of the DIOFAN® A050 coating is effective to reduce the thermal conductivity of the polymeric foam product such that the polymeric foam product has an R-value of 5 or greater over a longer period of time, as compared to an otherwise identical but uncoated polymeric foam product. Particularly, for the samples tested in this example, an R-value of 5 is achieved at a thermal conductivity of 0.20 Btu·in/h·ft$^2$·° F. or below. As shown in Table 10, not a single Comparative Sample achieved an R-value of 5 at any time point. However, each of Samples GG-00 achieved an R-value of 5 at $k_7$ and Samples GG-II and LL-NN achieved an R-value of 5 at $k_{30}$, and Sample LL achieved an R-value of 5 at $k_{60}$, which is a significant improvement over the Comparative Samples.

Figure 11:
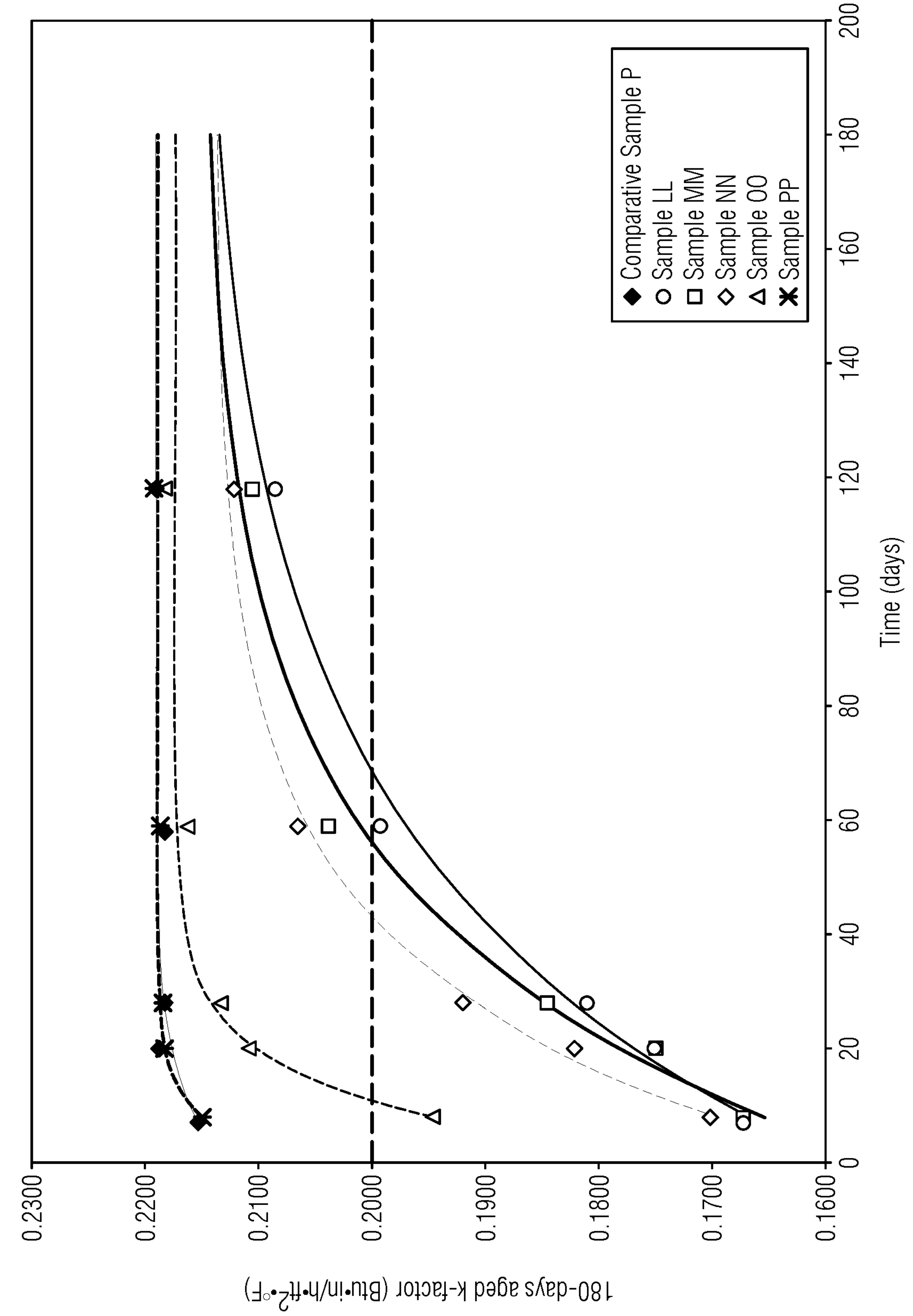
FIG. 11 is a graph showing the k-factor (y-axis) as a function of time (x-axis) for various samples including 0.50 wt. % isobutane and various barrier coating configurations according to Example 7.

FIG. 11 illustrates the measured thermal conductivity (k-factor) (y-axis) as a function of time in days (x-axis) for samples including 0.50 wt. % isobutane and with various surfaces having the barrier coating thereon (Comparative Sample P and Samples LL-PP). As shown in FIG. 11, application of the barrier coating to the major surfaces of the polymeric foam product has the biggest impact, while coating the only the edges has almost no impact.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A foamed polymeric insulation product comprising:

a rigid polymeric foam board having a first major surface and a second major surface, and a cross-section of a continuous structure of a polymeric foam material, the polymeric foam board formed from a foamable polymer composition comprising:

a) a thermoplastic matrix polymer composition, wherein the thermoplastic matrix polymer composition is selected from the group consisting of alkenyl aromatic polymers, styrenic polymers, styrenic copolymers, styrenic block copolymers, polyolefins, halogenated vinyl polymers, polycarbonates, polyesters, polyacrylates, phenolics, polysulfone, polyphenylene sulfide, acetal resins, polyamides, polyaramides, polyimides, polyetherimides, rubber modified polymers, polystyrene, and combinations thereof, and b) a blowing agent composition consisting of 1,1-difluoroethane (HFC-152a), fluoroethane (HFC-161), fluoromethane (HFC-41), 1,3,3,3-pentafluoropropane (HFO-1234ze), cis-1,1,1,4,4,4-hexafluoro-2-butene (HFO-1336mzz-Z) trans-1,1,1,4,4,4-hexafluoro-2-butene (HFO-1336mzz-E), 1,1,1-trifluoro-3-chloropropene (HCFO-1233zd), 1,1,1,3,3-pentafluorobutane (HFC-265mfc), or combinations thereof; and a barrier coating formed directly on at least one of the first major surface and the second major surface, the barrier coating being effective to stop or slow a diffusion rate of the blowing agent composition out of the polymeric foam board and formed from a barrier coating composition comprising a dispersion or emulsion comprising a solids content of from about 35 wt. % to about 60 wt. %, comprising:

20 wt. % to 99.9 wt. % of at least one polymer, based on a total amount of solids present in the barrier coating composition, wherein the at least one polymer is selected from polyvinylidene dichloride (PVDC), polyvinylidene fluoride (PVDF), polyvinyl alcohol, and combinations or copolymers thereof; and 0.1 wt. % to 20 wt. % of a viscosity modifier, based on the total amount of solids present in the barrier coating composition, and wherein the foamable polymer composition is free of methyl formate.

2. The foamed polymeric insulation product of claim 1, wherein the barrier coating composition further comprises at least one film-forming additive selected from the group consisting of graphene, nanoclays, inorganic layered particles, and combinations thereof.

3. The foamed polymeric insulation product of claim 1, wherein the barrier coating is formed directly on the first major surface and the second major surface of the polymeric foam board.

4. The foamed polymeric insulation product of claim 1, wherein the barrier coating is formed directly on at least one minor surface of the polymeric foam board.

5. The foamed polymeric insulation product of claim 1, wherein the foamed polymeric insulation product has a thermal resistance value (R-value) after 180 days of at least 4.75 per inch.

6. The foamed polymeric insulation product of claim 1, wherein the foamed polymeric insulation product has a thermal resistance value (R-value) after 180 days of at least 5.0 per inch.

7. A method of manufacturing a foamed polymeric insulation product, comprising:

a) providing a thermoplastic matrix polymer melt into an extruder, wherein the thermoplastic matrix polymer melt is selected from the group consisting of alkenyl aromatic polymers, styrenic polymers, styrenic copolymers, styrenic block copolymers, polyolefins, halogenated vinyl polymers, polycarbonates, polyesters, polyacrylates, phenolics, polysulfone, polyphenylene sulfide, acetal resins, polyamides, polyaramides, polyimides, polyetherimides, rubber modified polymers, polystyrene, and combinations thereof;

b) injecting a blowing agent composition consisting of 1,1-difluoroethane (HFC-152a), fluoroethane (HFC- 161), fluoromethane (HFC-41), 1,3,3,3-pentafluoropropane (HFO-1234ze), cis-1,1,1,4,4,4-hexafluoro-2-butene (HFO-1336mzz-Z), trans-1,1,1,4,4,4-hexafluoro-2-butene (HFO-1336mzz-E), 1,1,1-trifluoro-3-chloro-propene (HCFO-1233zd), 1,1,1,3,3-pentafluorobutane (HFC-265mfc), or combinations thereof into the matrix polymer melt within the extruder to form a foamable polymer composition;

c) extruding the foamable polymer composition to form a rigid polymer foam board having a first major surface and a second major surface, and a cross-section of a continuous structure of a polymeric foam material;

d) applying directly to at least one of the first major surface and the second major surface of the polymer foam board a barrier coating composition comprising a dispersion or emulsion comprising a solids content of from about 35 wt. % to about 60 wt. %, comprising:

20 wt. % to 99.9 wt. % of at least one polymer based on a total amount of solids present in the barrier coating composition, wherein the at least one polymer is selected from polyvinylidene dichloride (PVDC), polyvinylidene fluoride (PVDF), polyvinyl alcohol, and combinations or copolymers thereof; and 0.1 wt. % to 20 wt. % of a viscosity modifier based on the total amount of solids present in the barrier coating composition, wherein the barrier coating composition forms a barrier coating on the at least one of the first major surface and the second major surface of the polymer foam board effective to stop or slow a diffusion rate of the blowing agent composition out of the polymeric foam board, thereby forming a coated polymer foam, and wherein the foamable polymer composition is free of methyl formate.

8. The method of claim 7, wherein the coated polymer foam has a thermal resistance value (R-value) after 180 days of at least 5.0 per inch.

9. The method of claim 7, wherein applying the barrier coating composition comprises applying the barrier coating using a roller, using a brush, or spraying the barrier coating composition directly onto the at least one of the first major surface and the second major surface.

10. The method according to claim 7, the barrier coating being a first barrier coating on the at least one of the first major surface and the second major surface of the polymer foam board, the method further comprising:

applying to the at least one of the first major surface and the second major surface a second coating composition, wherein the second coating composition forms a second coating on the at least one of the first major surface and the second major surface of the polymer foam board.

11. The method according to claim 10, wherein the second coating composition comprises 40 wt. % to 99.9 wt. % of at least one polymer selected from polyvinylidene dichloride (PVDC), polyvinylidene fluoride (PVDF), polyvinyl alcohol, ethylene vinyl alcohol, and combinations or copolymers thereof; and 0.1 wt. % to 20 wt. % of a viscosity modifier.

12. The method according to claim 10, wherein the second coating composition comprises a dispersion of polyurethane and is applied on top of the first barrier coating composition.

13. The method according to claim 10, wherein the first barrier coating composition comprises a dispersion of polyvinylidene dichloride.

* * * * *